(12) United States Patent
Poeppel

(10) Patent No.: US 11,269,325 B2
(45) Date of Patent: Mar. 8, 2022

(54) SYSTEM AND METHODS TO ENABLE USER CONTROL OF AN AUTONOMOUS VEHICLE

(71) Applicant: Uber Technologies, Inc., San Francisco, CA (US)

(72) Inventor: Scott C. Poeppel, Pittsburgh, PA (US)

(73) Assignee: Uber Technologies, Inc., San Francisco, CA (US)

(*) Notice: Subject to any disclaimer, the term of this patent is extended or adjusted under 35 U.S.C. 154(b) by 197 days.

(21) Appl. No.: 16/544,294

(22) Filed: Aug. 19, 2019

(65) Prior Publication Data

US 2020/0019162 A1 Jan. 16, 2020

Related U.S. Application Data

(63) Continuation of application No. 15/615,870, filed on Jun. 7, 2017, now abandoned.

(51) Int. Cl.
*H04L 67/306* (2022.01)
*G06F 40/284* (2020.01)
(Continued)

(52) U.S. Cl.
CPC ....... *G05D 1/0061* (2013.01); *B60R 16/0231* (2013.01); *B60W 50/08* (2013.01);
(Continued)

(58) Field of Classification Search
CPC ...... G05D 1/0061; G05D 1/00; G05D 1/0088; B60W 10/04; B60W 30/182;
(Continued)

(56) References Cited

U.S. PATENT DOCUMENTS 9,465,388 B1 10/2016 Fairfield et al.
9,566,986 B1 2/2017 Gordon et al.
(Continued)

FOREIGN PATENT DOCUMENTS

EP 2169506 3/2010

OTHER PUBLICATIONS

PCT International Search Report and Written Opinion for PCT/US2018/036246, dated Aug. 31, 2018, 13 pages.
(Continued)

*Primary Examiner* — Yuri Kan, P. E.
(74) *Attorney, Agent, or Firm* — Schwegman Lundberg & Woessner, P.A.

(57) ABSTRACT

Systems and methods for providing a user control of an autonomous vehicle to enable the user to assist the autonomous vehicle. In one example embodiment, a computer implemented method includes identifying, by a computing system comprising one or more computing devices, an occurrence of an event associated with an autonomous vehicle. The event can hinder an ability of the autonomous vehicle to operate in an autonomous operating mode. In response to the occurrence of the event associated with the autonomous vehicle, the method includes determining, by the computing system, a user to operate the autonomous vehicle based at least in part on a profile associated with the user. The method includes providing, by the computing system, one or more control signals to cause the autonomous vehicle to enter into an operating mode that allows the user to operate the autonomous vehicle.

19 Claims, 8 Drawing Sheets

(51) Int. Cl.
  *G06Q 50/30* (2012.01)
  *G05D 1/00* (2006.01)
  *G06F 9/54* (2006.01)
  *B60R 16/023* (2006.01)
  *B60W 50/08* (2020.01)
(52) U.S. Cl.
  CPC ............ *G06F 9/542* (2013.01); *H04L 67/306* (2013.01); *G05D 2201/0212* (2013.01)
(58) Field of Classification Search
  CPC .. B60W 60/0053; H04L 29/08; H04L 67/306; G06Q 50/26; G06Q 50/30; E04H 6/12; B60R 16/0231; G06F 40/284; G08G 1/144
  See application file for complete search history.

(56) References Cited

U.S. PATENT DOCUMENTS

| | | | | |
|---|---|---|---|---|
| 2005/0108281 | A1* | 5/2005 | Kim | G06F 40/30 |
| 2014/0244096 | A1* | 8/2014 | An | G05D 1/0055 |
| | | | | 701/25 |
| 2014/0365390 | A1* | 12/2014 | Braun | G06Q 50/265 |
| | | | | 705/325 |
| 2016/0110836 | A1* | 4/2016 | Garg | G06Q 20/405 |
| | | | | 705/13 |
| 2016/0207538 | A1* | 7/2016 | Urano | G05D 1/0061 |
| 2016/0247247 | A1* | 8/2016 | Scicluna | G06Q 10/02 |
| 2016/0368522 | A1* | 12/2016 | Lubischer | B62D 1/183 |
| 2017/0028987 | A1* | 2/2017 | Yamada | B60W 30/182 |
| 2017/0068245 | A1* | 3/2017 | Scofield | A61B 5/369 |
| 2017/0297565 | A1* | 10/2017 | Joyce | B60W 10/04 |
| 2018/0004211 | A1* | 1/2018 | Grimm | G05D 1/0214 |
| 2018/0088574 | A1* | 3/2018 | Latotzki | G05D 1/0061 |
| 2018/0124213 | A1* | 5/2018 | Wood | H04W 4/023 |
| 2018/0128001 | A1* | 5/2018 | Auracher | E04H 6/12 |
| 2018/0137692 | A1* | 5/2018 | Ohmert | G07C 5/008 |

OTHER PUBLICATIONS

International Preliminary Report on Patentability for PCT/US2018/036246, dated Dec. 19, 2019, 10 pages.

* cited by examiner

SYSTEM AND METHODS TO ENABLE USER CONTROL OF AN AUTONOMOUS VEHICLE

PRIORITY CLAIM

The present application is a continuation of U.S. application Ser. No. 15/615,870 having a filing date of Jun. 7, 2017. Applicant claims priority to and the benefit of each of such applications and incorporate all such applications herein by reference in its entirety.

FIELD

The present disclosure relates generally to controlling the operating modes of an autonomous vehicle to enable a user to assistance an autonomous vehicle.

BACKGROUND

An autonomous vehicle is a vehicle that is capable of sensing its environment and navigating without human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path through such surrounding environment.

SUMMARY

Aspects and advantages of embodiments of the present disclosure will be set forth in part in the following description, or may be learned from the description, or may be learned through practice of the embodiments.

One example aspect of the present disclosure is directed to a computing system for providing user control of autonomous vehicles. The computing system includes one or more processors and one or more memory devices. The one or more memory devices store instructions that when executed by the one or more processors cause the computing system to perform operations. The operations include identifying an occurrence of an event associated with an autonomous vehicle. The operations include in response to identifying the occurrence of the event associated with the autonomous vehicle, identifying one or more users to potentially operate the autonomous vehicle to move the autonomous vehicle from a stopped position. The operations include determining at least one of the users to operate the autonomous vehicle based at least in part on a profile associated with the at least one user. The operations include providing one or more control signals to cause the autonomous vehicle to enter into an operating mode that allows the at least one user to operate the autonomous vehicle.

Another example aspect of the present disclosure is directed to a computer-implemented method of providing user control of autonomous vehicles. The method includes identifying, by a computing system comprising one or more computing devices, an occurrence of an event associated with an autonomous vehicle. The event hinders an ability of the autonomous vehicle to operate in an autonomous operating mode. The method includes in response to the occurrence of the event associated with the autonomous vehicle, determining, by the computing system, a user to operate the autonomous vehicle based at least in part on a profile associated with the user. The method includes providing, by the computing system, one or more control signals to cause the autonomous vehicle to enter into an operating mode that allows the user to operate the autonomous vehicle.

Yet another example aspect of the present disclosure is directed to an autonomous vehicle. The autonomous vehicle includes one or more processors and one or more memory devices. The one or more memory devices store instructions that when executed by the one or more processors cause the autonomous vehicle to perform operations. The operations include providing, to one or more computing devices that are remote from the autonomous vehicle, data indicative of an event associated with the autonomous vehicle. The operations include receiving data indicating that the autonomous vehicle is to enter into an operating mode. The operating mode allows a user to operate the autonomous vehicle to control a motion of the autonomous vehicle. The user is determined based at least in part on a profile associated with the user. The operations include causing the autonomous vehicle to enter into the operating mode to allow the user to operate the autonomous vehicle to control the motion of the autonomous vehicle.

Other example aspects of the present disclosure are directed to systems, methods, vehicles, apparatuses, tangible, non-transitory computer-readable media, and memory devices for providing user control of autonomous vehicles.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
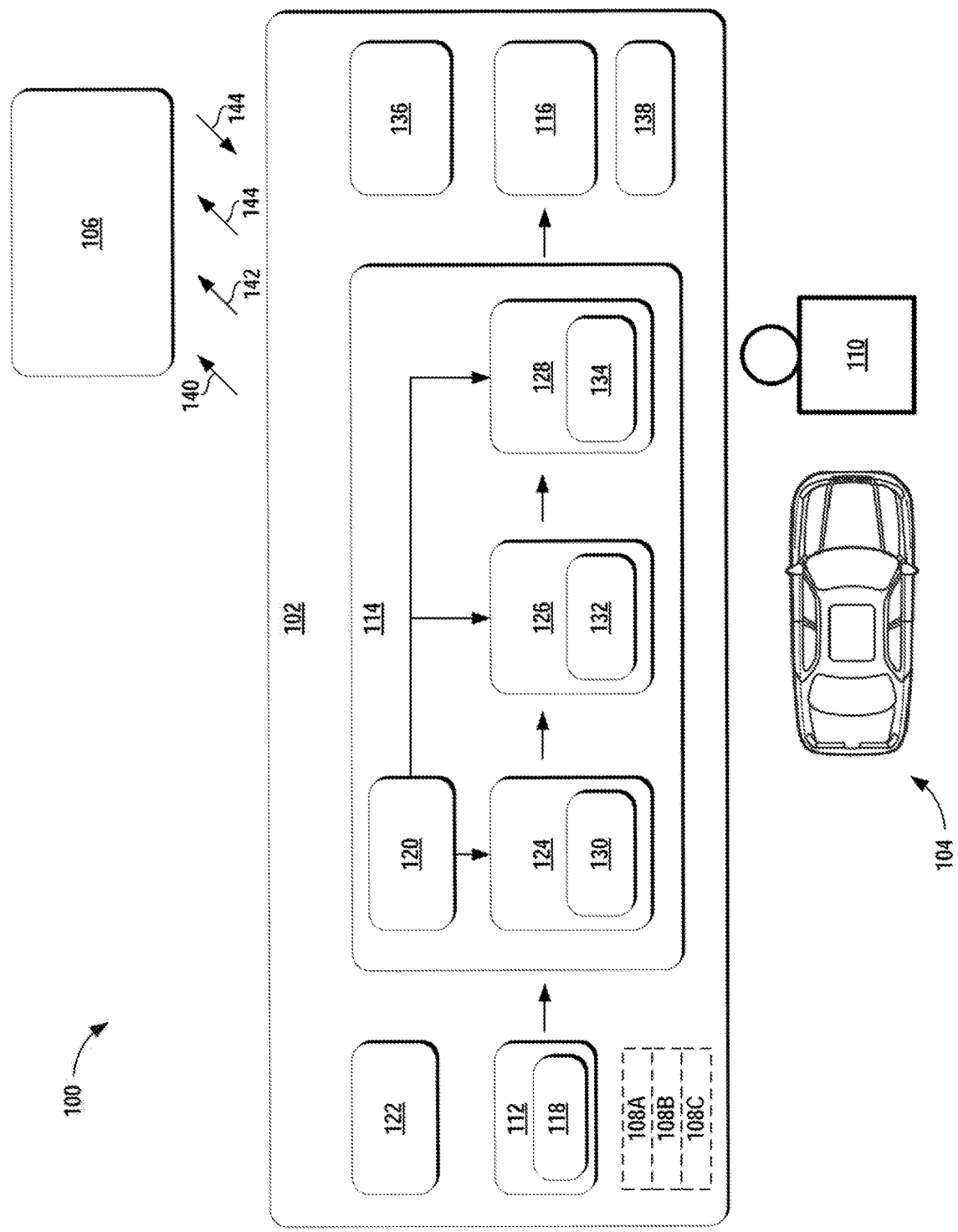
FIG. 1 depicts an example system overview according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to providing a user with manual control of a distressed autonomous vehicle to improve the ability to assist a distressed autonomous vehicle. For instance, an entity (e.g., service provider) can use a fleet of vehicles to provide a vehicle service (e.g., transportation service) to a plurality of users associated with the vehicle service. The fleet can include, for example, autonomous vehicles that can drive, navigate, operate, etc. with minimal and/or no interaction from a human driver. The autonomous vehicles can be configured to operate in a plurality of operating modes such as a manual operating mode (e.g., the vehicle is fully controlled by a human driver), a semi-autonomous operating mode (e.g., the vehicle operates with some interaction from a human driver), and/or a fully autonomous operating mode (e.g., vehicle operates with no interaction from a human driver). The autonomous vehicles can be configured to provide one or more vehicle services such as, for example, a transportation service (e.g., rideshare service) to one or more users. The user(s) associated with the vehicle service can be, for example, passenger(s) of the autonomous vehicle and/or another type of user, as will be further described herein. Each user can have a profile that indicates various types of information about the user. For example, the profile can include information such as the user's name, vehicle preferences, rating, etc. In some implementations, the profile can optionally include information indicating whether the user is legally able to operate the vehicle, has a valid license, driving restrictions, etc. and/or an indication as to whether the user is willing to assist a distressed autonomous vehicle.

By way of example, the autonomous vehicle can experience an event such as a fault (e.g., sensor error, data storage failure, onboard system communication error, etc.) that reduces (or at least temporarily eliminates) the ability of the autonomous vehicle to autonomously operate (e.g., without human interaction). As a safety precaution, the autonomous vehicle may decelerate to a stopped position, which may occur in a travel way of the vehicle (e.g., a traffic lane). The entity can determine whether a user (e.g., a current passenger that is not a designated safety driver of the vehicle) is authorized and willing to operate the autonomous vehicle (e.g., to move the vehicle to a safe location) based at least in part on a profile associated with the user. If so, the entity can request that the user operate the vehicle so long as the user would not be placed in a potentially dangerous position. The autonomous vehicle can enter into a manual operating mode to allow the user to move the autonomous vehicle from its stopped position (e.g., to a safer area). In this way, the systems and methods of the present disclosure can help reduce potential risk to the autonomous vehicle and help prevent resultant traffic build-up, without having to deploy a maintenance team to move the distressed vehicle.

More particularly, an entity (e.g., service provider, owner, manager) can use one or more vehicles (e.g., ground-based vehicles) to provide a vehicle service such as a transportation service (e.g., rideshare service), a courier service, a delivery service, etc. The vehicle(s) can be autonomous vehicles that include various systems and devices configured to control the operation of the vehicle. For example, an autonomous vehicle can include a vehicle computing system for operating the vehicle. The vehicle computing system is located onboard the autonomous vehicle, in that the vehicle computing system is located on or within the autonomous vehicle. The vehicle computing system can receive sensor data from sensor(s) onboard the vehicle (e.g., cameras, LIDAR, RADAR), attempt to comprehend the vehicle's surrounding environment by performing various processing techniques on the sensor data, and generate an appropriate motion plan through the vehicle's surrounding environment. Moreover, the autonomous vehicle can be configured to communicate with one or more computing devices that are remote from the vehicle. For example, the autonomous vehicle can communicate with an operations computing system that can be associated with the entity. The operations computing system can help the entity monitor, communicate with, manage, etc. the fleet of vehicles.

An autonomous vehicle can be configured to operate in a plurality of operating modes. For example, an autonomous vehicle can be configured to operate in a fully autonomous (e.g., self-driving) operating mode in which the autonomous vehicle can drive and navigate with no interaction from a user present in the vehicle. The autonomous vehicle can be configured to operate in a semi-autonomous operating mode in which the autonomous vehicle can operate with some interaction from a user present in the vehicle. In some implementations, the autonomous vehicle can enter into a manual operating mode in which the vehicle is fully controllable by a user (e.g., human driver) and can be prohibited from performing autonomous navigation (e.g., autonomous driving that may be inconsistent with a human operator's control).

The autonomous vehicle can experience an event that effects the autonomous operation of the vehicle. For instance, the autonomous vehicle can experience a fault in the operation of one or more of its sensors (e.g., LIDAR system), a fault associated with the vehicle's onboard autonomy computing system, a fault associated with a vehicle control system, and/or other types of faults. By way of example, the autonomous vehicle can experience a communication error between the vehicle's onboard systems (e.g., between a motion planning system and the vehicle control system(s)) such that the vehicle is unable to properly navigate through its surroundings in a fully autonomous operating mode. As such, the autonomous vehicle can decelerate until the vehicle reaches a stopped position. In some circumstances, the stopped position of the vehicle may be located at least partially in a travel way (e.g., traffic lane).

The operations computing system (e.g., of the entity) can identify an occurrence of the event associated with the autonomous vehicle. In some implementations, the vehicle computing system of the autonomous vehicle can inform the operations computing system of the occurrence of the event. For example, the vehicle computing system can detect a communication error between the onboard systems of the vehicle. The vehicle computing system can provide data indicating that the communication error has occurred and/or that the vehicle is stopping (or has stopped) due to the event. The operations computing system can receive such data and identify that the event associated with the autonomous vehicle has occurred such that the vehicle cannot effectively operate in a fully autonomous operating mode. In some implementations, the operations computing system can monitor the autonomous vehicle (e.g., in real-time, in near real-time, periodically, etc.) and determine that an event has occurred with respect to the autonomous vehicle. Additionally, or alternatively, a user (e.g., a passenger, a non-rider observer) can send a communication to the operations computing system and/or otherwise inform the entity associated with the vehicle that an event has occurred (e.g., via a telephone conversation with an operator, textual message, etc.).

The autonomous vehicle can perform an evaluation to determine whether the vehicle is in condition to be operated by a user. The vehicle computing system can perform an onboard diagnostic to determine the cause, source, location, etc. of the event to determine if operating the autonomous vehicle in a manual operating mode would increase the risk of harm to a human driver and/or the risk of harm to the vehicle itself. By way of example, the vehicle computing system can determine that the autonomous vehicle has a flat tire. The vehicle computing system can provide a communication to the operations computing system indicating that the autonomous vehicle is not in a condition to be operated by a human driver. In such a case, the operations computing system can coordinate the deployment of a maintenance team to the autonomous vehicle.

For an autonomous vehicle that would be safe for a user to operate, the vehicle computing system can identify one or more users that may be available to potentially operate the autonomous vehicle. The user(s) can be associated with a vehicle service (e.g., of the entity). For example, the user(s) can include a user that has downloaded a software application associated with the entity, a user that has made a service request with the entity, a user that is a customer of the entity, a user that has registered with (e.g., signed-up with, has an account with, has subscribed to) the entity, a user that is a vehicle operator (e.g., human driver) of one or more vehicles within a fleet of the entity, etc. The user(s) can be passenger(s) of the autonomous vehicle. For example, the autonomous vehicle can provide a rideshare service to transport a plurality of passengers from an origin to a destination location. Based at least in part on the occurrence of the event associated with the autonomous vehicle (e.g., that has caused the vehicle to stop), the operations computing system can identify the plurality of passengers as users that could potentially operate the vehicle.

In some implementations, the user(s) can be non-passenger user(s) that are not currently riding in the autonomous vehicle. By way of example, the autonomous vehicle can experience an event (e.g., sensor hardware overheating) while no passengers are riding in the vehicle. The operations computing system can identify one or more users associated with the vehicle service (e.g., customers of the entity) that are within the vicinity of the autonomous vehicle and that could potentially operate the vehicle to move the vehicle to a safer position. In some implementations, the operations computing system can identify a user that is a vehicle operator associated with the entity. By way of example, another vehicle within the vehicle fleet can be located within the vicinity of the autonomous vehicle. The operations computing system can identify a human driver of that other vehicle as a user that could potentially operate the autonomous vehicle to move it to a different location.

In some implementations, the operations computing system can identify users that can potentially operate the autonomous vehicle based at least in part on one or more factor(s). For example, the operations computing system can identify the user(s) based at least in part on a distance between the user(s) and the autonomous vehicle, an estimated time it would take for the user(s) to travel to the autonomous vehicle, a route the user(s) would traverse to arrive at the location of the autonomous vehicle, and/or other factors. For example, the operations computing system may first identify passengers of the autonomous vehicle, then nearby non-passenger users of the vehicle service(s), and then human driver(s) of other vehicles in the fleet based on the distance, time, route, etc. between that respective user and the autonomous vehicle.

Each user can be associated with a profile that includes various types of information associated with the user. For example, the entity can maintain a database of profiles of the users associated with the vehicle services (and/or the entity). The profile can be a data structure that includes information such as a user identifier (e.g., name, email address, etc.), age, preferences (e.g., type of vehicle, music, temperature, driving style, etc.), legal restrictions, physical restrictions, and/or other information associated with a user. In some implementations, the profile can optionally include information indicating that the user is legally authorized to operate a vehicle (e.g., information associated with a vehicle operating license). The profile can also include an indication of the user's willingness to operate the autonomous vehicle (e.g., due to an event that causes the vehicle to be distressed). A profile associated with a user can be generated by the entity associated with the autonomous vehicle and/or by the user (e.g., when the user registers with the entity, downloads a software application, etc.).

A user can be permitted a certain level of control over the types of information included in the user's profile. For example, a user can select whether information associated with the user's vehicle operating license is included in the user's profile and/or whether the user is willing to operate a distressed autonomous vehicle. In some implementations, data/information associated with the user can be treated and/or processed using one or more techniques before it is stored and/or used. For example, one or more processing techniques can be utilized to remove certain user information and/or geographic information associated with the user. In some implementations, a user profile may not be created unless the user downloads a particular software application, selects a setting on a user device, etc. This can allow a user to elect whether (and/or when) the entity obtains information.

The operations computing system can determine a user to operate the autonomous vehicle based at least in part on the profile associated with the user. For example, the operations computing system can access the profile associated with a user to determine whether the user is authorized to operate the vehicle based at least in part on a vehicle operating license (e.g., driver's license) of the user. Additionally, or alternatively, the operations computing system can confirm that the user is willing to operate the autonomous vehicle based at least in part on such an indication provided in the respective user profile. The operations computing system can also, or alternatively, select a user to operate the autonomous vehicle based at least in part on other information provided in the user's profile.

The operations computing system can facilitate communication with a user to request that the user operate the autonomous vehicle to control the motion of the vehicle (e.g., to change the location of the vehicle). For example, the operations computing system can send a textual message to the selected user via a user device associated with the user (e.g., a mobile phone) and/or via a human machine interface (e.g., a tablet) onboard the autonomous vehicle. The textual message can inquire as to the user's willingness to operate the autonomous vehicle and/or request that the user operate the autonomous vehicle. In some implementations, a human operator associated with the entity can contact the user to determine whether the user is willing to operate the autonomous vehicle and/or request that the user operate the autonomous vehicle. In some implementations, the user can be provided with an incentive (e.g., monetary, credit, discount, increase user rating, etc.) to operate the autonomous vehicle.

The following provides an example of the identification and selection of a user to operate the autonomous vehicle. One or more passengers can be riding in the autonomous vehicle for a transportation service when a rock strikes the vehicle sensors. As a precautionary measure, the autonomous vehicle can decelerate to a stopped position. The stopped position may be at least partially within a roadway. The operations computing system can detect the occurrence of such an event, as described herein. The operations computing system can identify one or more of the passengers of the autonomous vehicle as users that can potentially operate the vehicle to move it from the stopped position to a shoulder of the road. The operations computing system can access the profiles associated with the one or more users to determine which (if any) of the users are licensed to operate the vehicle and/or are willing to operate the vehicle. The operations computing system can determine at least one of the users to operate the autonomous vehicle based at least in part on the profile associated with that user (and/or the other user profiles). For example, only one of the passengers may have a valid driver's license and/or have indicated a willingness to operate an autonomous vehicle. Thus, the operations computing system can send a communication to the selected user to request that the user drive the autonomous vehicle to a safe location on the shoulder of the road.

In some implementations, the operations computing system can perform an additional user authorization step. For example, if a user is willing to operate the autonomous vehicle, the operations computing system can prompt the user (e.g., via a user device, human machine interface, etc.) to scan the user's vehicle operating license via an imaging device associated with a user device and/or onboard the autonomous vehicle. In this way, the operations computing system can attempt to obtain up-to-date information regarding the user's legal operating status with respect to a vehicle.

To enable the user to operate the autonomous vehicle, the operations computing system can adjust the operating mode of the autonomous vehicle. For instance, the operations computing system can provide one or more control signals to cause the autonomous vehicle to enter into an operating mode that allows the user to operate the autonomous vehicle. By way of example, the operations computing system can send one or more first control signals to the vehicle computing system instructing the autonomous vehicle to enter into a manual operating mode. The vehicle computing system can receive the first control signal(s) indicating that the autonomous vehicle is to enter into the manual operating mode. The vehicle computing system can adjust the operating mode of the vehicle accordingly. For instance, the vehicle computing system can send one or more second control signals to one or more systems onboard the vehicle (e.g., the vehicle control systems) to cause the vehicle to enter into the manual operating mode. The autonomous vehicle can enter into the manual operating mode such that the user can control the motion of the autonomous vehicle via one or more vehicle input devices within the interior of the autonomous vehicle (e.g., steering mechanism, acceleration mechanism, braking mechanism, etc.).

In some implementations, the autonomous vehicle can be subject to one or more limitations while in the manual operating mode. For example, the autonomous vehicle can be subject to a limitation on a speed associated with the autonomous vehicle (e.g., a maximum speed and/or acceleration limit), a limitation on a distance associated with the autonomous vehicle (e.g., a maximum distance the vehicle is permitted to travel from its stopped position), a limitation on an amount of time a user can operate the autonomous vehicle, and/or other limitations. Additionally, and/or alternatively, the autonomous vehicle can be subject to a limitation on the location to which the autonomous vehicle can travel. By way of example, the vehicle computing system can determine that traffic is located (or likely to be located) to the left of the autonomous vehicle based at least in part on sensor data associated with the vehicle's surrounding environment (e.g., LIDAR data showing one or more objects to the left of the vehicle) and/or map data provided to the autonomous vehicle (e.g., indicating an active travel lane adjacent to the vehicle). The vehicle computing system can limit the motion of a steering mechanism of the autonomous vehicle such that the user cannot steer the vehicle into traffic from the stopped position of the vehicle. In this way, the vehicle computing system can leverage the data acquired onboard the vehicle and/or provided to the autonomous vehicle to help increase the safety of the user and the autonomous vehicle while in the manual operating mode.

The systems and methods described herein may provide a number of technical effects and benefits. For instance, the operations computing system can leverage a network of users to select a user that is within the vicinity of the vehicle (or a passenger of the vehicle) to manually control a distressed autonomous vehicle. This allows the autonomous vehicle to be quickly moved to a location that may be safer for the vehicle (and its passengers) and that may be more convenient for the vehicle to re-cycle its power, perform onboard diagnostics, receive remote trouble-shooting instructions, etc.

Additionally, by enabling users to manually operate a distressed autonomous vehicle, the systems and methods described herein can help save valuable resources that would otherwise be used for coordinating and deploying maintenance/servicing teams to the vehicles. More particularly, some vehicle events can be addressed by the vehicle computing system (e.g., via a power re-boot) and/or via remote communication with an off-board computing system. Thus, by enabling a user to move the vehicle, the operations computing system can avoid sending a maintenance team to a vehicle that may be able to address an event without the maintenance team. By reducing the need for maintenance team deployment, the systems and methods described herein can limit the allocation of processing and storage resources that are required for such deployment (e.g., by the operations computing system). The saved resources can be allocated to other functions of the operations computing systems, such as the processing of service requests, generating user interfaces, vehicle routing, etc. In this way, the systems and methods according to example aspects of the present disclosure have a technical effect of providing a computationally efficient approach to assisting distressed vehicles.

The systems and methods of the present disclosure also provide an improvement to vehicle computing technology, such as autonomous vehicle computing technology. For instance, the computer-implemented methods and systems improve the ability of the computing technology to assist a distressed autonomous vehicle that has been deployed for service. For example, the systems and methods can enable computing device(s) (e.g., of an operations computing system) to identify the occurrence of an event associated with an autonomous vehicle that is configured to provide a vehicle service. The event can include, for example, a fault that effects autonomous operation of the autonomous vehicle, such that the vehicle decelerates to a stopped position as a safety precaution. The computing device(s) can identify one or more users to potentially operate the autonomous vehicle to move the autonomous vehicle from the stopped position. The computing device(s) can determine at least one of the users to operate the autonomous vehicle based at least in part on a profile associated with the at least one user. The computing device(s) can provide one or more control signals to cause the autonomous vehicle to enter into an operating mode that allows the at least one user to operate the autonomous vehicle (e.g., to move the vehicle from its stopped position). By selecting a user based at least in part on a user profile, the operations computing system can effectively and efficiently determine a user that is authorized and willing to operate the autonomous vehicle. This can allow the operations computing system to avoid real-time vetting of users to operate the autonomous vehicle, saving considerable processing resources. Moreover, by enabling the vehicle to be manually controlled by a user, the operations computing system can avoid significant communication latency problems that can arise from remote control of the vehicle.

With reference now to the FIGS., example embodiments of the present disclosure will be discussed in further detail. FIG. 1 depicts an example system 100 according to example embodiments of the present disclosure. The system 100 can include a vehicle computing system 102 associated with a vehicle 104 and an operations computing system 106 that is remote from the vehicle 104.

The vehicle 104 incorporating the vehicle computing system 102 can be a ground-based autonomous vehicle (e.g., car, truck, bus, etc.), an air-based autonomous vehicle (e.g., airplane, drone, helicopter, or other aircraft), or other types of vehicles (e.g., watercraft, etc.). The vehicle 104 can be an autonomous vehicle that can drive, navigate, operate, etc. with minimal and/or no interaction from a human driver. For instance, the vehicle 104 can be configured to operate in a plurality of operating modes 108A-C. The vehicle 104 can be configured to operate in a fully autonomous (e.g., self-driving) operating mode 108A in which the vehicle 104 can drive and navigate with no input from a user present in the vehicle 104. The vehicle 104 can be configured to operate in a semi-autonomous operating mode 108B in which the vehicle 104 can operate with some input from a user present in the vehicle 104. The vehicle 104 can enter into a manual operating mode 108C in which the vehicle 104 is fully controllable by a user (e.g., human driver) and can be prohibited from performing autonomous navigation (e.g., autonomous driving). In some implementations, the vehicle 104 can implement vehicle operating assistance technology (e.g., collision mitigation system, power assist steering, etc.) while in the manual operating mode 108C to help assist the operator of the vehicle 104.

The operating mode of the vehicle 104 can be adjusted in a variety of manners. In some implementations, the operating mode of the vehicle 104 can be selected remotely, off-board the vehicle 104. For example, an entity associated with the vehicle 104 (e.g., a service provider) can utilize the operations computing system 106 to manage the vehicle 104 (and/or an associated fleet). The operations computing system 106 can send one or more control signals to the vehicle 104 instructing the vehicle 104 to enter into, exit from, maintain, etc. an operating mode. By way of example, the operations computing system 106 can send one or more control signals to the vehicle 104 instructing the vehicle 104 to enter into the fully autonomous operating mode 108A. In some implementations, the operating mode of the vehicle 104 can be set onboard and/or near the vehicle 104. For example, the operating mode of the vehicle 104 can be selected via one or more interfaces located onboard the vehicle 104 (e.g., key switch, button, etc.) and/or associated with a computing device proximate to the vehicle 104 (e.g., a tablet operated by authorized personnel located near the vehicle 104). In some implementations, the operating mode of the vehicle 104 can be adjusted based at least in part on a sequence of interfaces located on the vehicle 104. For example, the operating mode may be adjusted by manipulating a series of interfaces in a particular order to cause the vehicle 104 to enter into a particular operating mode.

In some implementations, the vehicle 104 can be associated with an entity (e.g., a service provider, owner, manager). The entity can be one that provides one or more vehicle service(s) to a plurality of users via a fleet of vehicles that includes, for example, the vehicle 104. In some implementations, the entity can be associated with only vehicle 104 (e.g., a sole owner, manager). In some implementations, the operations computing system 106 can be associated with the entity.

The vehicle 104 can be configured to provide one or more vehicle services to one or more users. The vehicle service(s) can include transportation services (e.g., rideshare services in which user rides in the vehicle 104 to be transported), courier services, delivery services, and/or other types of services. The vehicle 104 can operate in a particular operating mode when providing the vehicle service to the user(s). For example, the vehicle 104 can operate in a fully autonomous mode 108A when providing a transportation service to the user(s).

Figure 2:
FIG. 2 depicts an example user profile according to example embodiments of the present disclosure.

A user can be associated with a profile that indicates various types of information about the user. For instance, FIG. 2 depicts an example user profile 200 according to example embodiments of the present disclosure. The profile 200 can be a data structure that stores information associated with a user. In some implementations, an entity associated with the vehicle 104 can maintain a secure database of profiles of the users associated with the vehicle services. The profile 200 can be accessed by a user (e.g., via a computing device) and/or by the entity (e.g., by authorized personnel). In some implementations, the profile 200 can be provided for display via an interactive user interface of a display device. This can allow a user and/or the entity to modify, edit, remove, etc. the profile 200 and the information included therein. In some implementations, a user can create the profile 200 associated with the user by, for example, providing user input via a user interface. Additionally, or alternatively, a computing system associated with the entity can automatically generate a profile 200 associated with a user (e.g., when a user registers with the entity, downloads a software application, etc.).

The profile 200 can include a variety of information associated with the user (and/or links thereto). Some or all of the information included in the profile 200 may be optionally included in the profile 200. For example, in some implementations, the profile 200 can include a user identifier 202 such as a name of a user, an email address of a user, a username associated with a user, and/or other information that can be used to help identify a user. As shown in FIG. 2, the profile 200 can also include an age of the user. In some implementations, the profile 200 can include information associated with one or more preferences 204 of a user. For example, the profile 200 can include information associated with a preferred music (e.g., genre, time period, etc.), a preferred vehicle type (e.g., make, model, year, luxury level, etc.), a preferred internal temperature of a vehicle, a preferred driving style (e.g., avoidance of speed bumps), and/or other preferences associate with a user. In some implementations, the profile 200 can optionally include information associated with one or more payment methods 206 associated with a user. For example, in the event that the entity coordinates one or more vehicles to provide a vehicle service to a user, the user may transmit payment to the entity for the vehicle services via one or more of the payment methods (e.g., credit card information, electronic payment information, etc.). The profile 200 can include information 208 associated with a rating and/or history of a user. For example, a user can be associated with a rating that is indicative of the user's behavior when receiving vehicle services, payment reliability, etc. A history associated with a user can include a history (e.g., date, time, duration, location, etc.) of the vehicle services provided to a user.

In some implementations, the profile 200 can optionally include information 210 associated with a vehicle operating license of a user. For example, the profile 200 can optionally include a number associated with the vehicle operating license of a user, an issuing authority associated with the vehicle operating license, an issue date associated with the vehicle operating license, an expiration date associated with the vehicle operating license, any restrictions associated with the vehicle operating license (e.g., time of day restrictions, etc.), and/or other information associated with a vehicle operating license of a user. Such information can allow the profile 200 to indicate that a user is legally able to operate a vehicle 104. The information 210 can be utilized to determine that a user is legally able to operate a vehicle and then can be deleted such that the information 210 is not stored by the operations computing system 106.

The profile 200 associated with the user can also, or alternatively, include data 212 indicative of a willingness of the user to operate a vehicle 104 (e.g., an autonomous vehicle). For example, a user can be prompted to indicate whether or not the user would be willing to operate a vehicle in the event that the vehicle needs assistance from a human driver. The profile 200 can include data 212 (e.g., text, graphic representation, symbol, etc.) that indicates that the user is willing to operate a vehicle, that the user is not willing to operate a vehicle, and/or that the user has not responded to such a prompt. In some implementations, a user's willingness to operate a distressed vehicle can affect the provision of services to the user. For instance, when generating a pool of users to be assigned to a vehicle for transportation services (e.g., a pool for rideshare services), the operations computing system 106 can select at least one user to include in the pool that is legally able and/or willing to operate the vehicle.

As described herein, a user can be permitted a certain level of control over the types of information included in the profile 200. For example, a user can select whether information 210 associated with the user's vehicle operating license is included in the profile 200 and/or whether the profile 200 indicates that the user is willing to operate a distressed vehicle. In some implementations, data/information associated with the user can be treated and/or processed using one or more techniques before it is stored and/or used. For example, one or more processing techniques can be utilized to remove certain information associated with the user. In some implementations, the profile 200 may not be created unless the user downloads a particular software application, selects a setting on a user device, provides express permission, etc. This can allow a user to elect whether (and/or when) the entity obtains information associated with a user.

Returning to FIG. 1, the vehicle computing system 102 can include one or more computing devices located onboard the vehicle 104. For example, the computing device(s) can be located on and/or within the vehicle 104. The computing device(s) can include various components for performing various operations and functions. For instance, the computing device(s) can include one or more processor(s) and one or more tangible, non-transitory, computer readable media. The one or more tangible, non-transitory, computer readable media can store instructions that when executed by the one or more processor(s) cause the vehicle 104 (e.g., its computing system, one or more processors, etc.) to perform operations and functions.

As shown in FIG. 1, the vehicle 104 can include one or more sensors 112, an autonomy computing system 114, and one or more vehicle control systems 116. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can send and/or receive data, messages, signals, etc. amongst one another via the communication channel.

The sensor(s) 112 can be configured to acquire sensor data 118 associated with one or more objects that are proximate to the vehicle 104 (e.g., within a field of view of one or more of the sensor(s) 112). The sensor(s) 112 can include a Light Detection and Ranging (LIDAR) system, a Radio Detection and Ranging (RADAR) system, one or more cameras (e.g., visible spectrum cameras, infrared cameras, etc.), motion sensors, and/or other types of imaging capture devices and/or sensors. The sensor data 118 can include image data, radar data, LIDAR data, and/or other data acquired by the sensor(s) 112. The object(s) can include, for example, pedestrians, vehicles, bicycles, and/or other objects. The object(s) can be located in front of, to the rear of, and/or to the side of the vehicle 104. The sensor data 118 can be indicative of locations associated with the object(s) within the surrounding environment of the vehicle 104 at one or more times. The sensor(s) 112 can provide the sensor data 118 to the autonomy computing system 114.

In addition to the sensor data 118, the autonomy computing system 114 can retrieve or otherwise obtain map data 120. The map data 120 can provide detailed information about the surrounding environment of the vehicle 104. For example, the map data 120 can provide information regarding: the identity and location of different roadways, road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle 104 in comprehending and perceiving its surrounding environment and its relationship thereto.

The vehicle 104 can include a positioning system 122. The positioning system 122 can determine a current position of the vehicle 104. The positioning system 122 can be any device or circuitry for analyzing the position of the vehicle 104. For example, the positioning system 122 can determine position by using one or more of inertial sensors, a satellite positioning system, based on IP address, by using triangulation and/or proximity to network access points or other network components (e.g., cellular towers, WiFi access points, etc.) and/or other suitable techniques. The position of the vehicle 104 can be used by various systems of the vehicle computing system 102 and/or provided to a remote computing device (e.g., of the operations computing system 106). For example, the map data 120 can provide the vehicle 104 relative positions of the surrounding environment of the vehicle 104. The vehicle 104 can identify its position within the surrounding environment (e.g., across six axes) based at least in part on the data described herein. For example, the vehicle 104 can process the sensor data 118 (e.g., LIDAR data, camera data) to match it to a map of the surrounding environment to get an understanding of the vehicle's position within that environment.

The autonomy computing system 114 can include a perception system 124, a prediction system 126, a motion planning system 128, and/or other systems that cooperate to perceive the surrounding environment of the vehicle 104 and determine a motion plan for controlling the motion of the vehicle 104 accordingly. For example, the autonomy computing system 114 can receive the sensor data 118 from the sensor(s) 112, attempt to comprehend the surrounding environment by performing various processing techniques on the sensor data 118 (and/or other data), and generate an appropriate motion plan through such surrounding environment. The autonomy computing system 114 can control the one or more vehicle control systems 116 to operate the vehicle 104 according to the motion plan.

The autonomy computing system 114 can identify one or more objects that are proximate to the vehicle 104 based at least in part on the sensor data 118 and/or the map data 120. For example, the perception system 124 can obtain state data 130 descriptive of a current state of an object that is proximate to the vehicle 104. The state data 130 for each object can describe, for example, an estimate of the object's: current location (also referred to as position); current speed (also referred to as velocity); current acceleration; current heading; current orientation; size/footprint (e.g., as represented by a bounding polygon); class (e.g., pedestrian class vs. vehicle class vs. bicycle class), and/or other state information. The perception system 124 can provide the state data 130 to the prediction system 126 (e.g., for predicting the movement of an object).

The prediction system 126 can create predicted data 132 associated with each of the respective one or more objects proximate to the vehicle 104. The predicted data 132 can be indicative of one or more predicted future locations of each respective object. The predicted data 132 can be indicative of a predicted path (e.g., predicted trajectory) of at least one object within the surrounding environment of the vehicle 104. For example, the predicted path (e.g., trajectory) can indicate a path along which the respective object is predicted to travel over time (and/or the speed at which the object is predicted to travel along the predicted path). The prediction system 126 can provide the predicted data 132 associated with the object(s) to the motion planning system 128.

The motion planning system 128 can determine a motion plan 134 for the vehicle 104 based at least in part on the predicted data 132 (and/or other data). The motion plan 134 can include vehicle actions with respect to the objects proximate to the vehicle 104 as well as the predicted movements. For instance, the motion planning system 128 can implement an optimization algorithm that considers cost data associated with a vehicle action as well as other objective functions (e.g., cost functions based on speed limits, traffic lights, etc.), if any, to determine optimized variables that make up the motion plan 134. By way of example, the motion planning system 128 can determine that the vehicle 104 can perform a certain action (e.g., pass an object) without increasing the potential risk to the vehicle 104 and/or violating any traffic laws (e.g., speed limits, lane boundaries, signage). The motion plan 134 can include a planned trajectory, speed, acceleration, etc. of the vehicle 104.

The motion planning system 128 can provide the motion plan 134 with data indicative of the vehicle actions, a planned trajectory, and/or other operating parameters to the vehicle control system(s) 116 to implement the motion plan 134 for the vehicle 104. For instance, the vehicle 104 can include a mobility controller configured to translate the motion plan 134 into instructions. By way of example, the mobility controller can translate a determined motion plan 134 into instructions to adjust the steering of the vehicle 104 "X" degrees, apply a certain magnitude of braking force, etc. The mobility controller can send one or more control signals to the responsible vehicle control component (e.g., braking control system, steering control system, acceleration control system) to execute the instructions and implement the motion plan 134.

The vehicle 104 can include a communications system 136 configured to allow the vehicle computing system 102 (and its computing device(s)) to communicate with other computing devices. The vehicle computing system 102 can use the communications system 136 to communicate with the operations computing system 106 and/or one or more other remote computing device(s) over one or more networks (e.g., via one or more wireless signal connections). In some implementations, the communications system 136 can allow communication among one or more of the system(s) on-board the vehicle 104. The communications system 136 can include any suitable components for interfacing with one or more network(s), including, for example, transmitters, receivers, ports, controllers, antennas, and/or other suitable components that can help facilitate communication.

The vehicle 104 can include one or more human-machine interfaces 138. For example, the vehicle 104 can include one or more display devices located onboard the vehicle 104. A display device (e.g., screen of a tablet, laptop, etc.) can be viewable by a user of the vehicle 104 that is located in the front of the vehicle 104 (e.g., driver's seat, front passenger seat). Additionally, or alternatively, a display device can be viewable by a user of the vehicle 104 that is located in the rear of the vehicle 104 (e.g., back passenger seat(s)). The human machine interface(s) 138 can receive information from a user via user input and/or provide information for display, as further described herein.

The vehicle 104 can also include one or more vehicle input devices that are located onboard the vehicle 104 (e.g., on and/or within the vehicle 104). The vehicle input device(s) can be configured to adjust the operation of the vehicle 104 based at least in part on an input by a user with respect to the vehicle input device(s) such as by physical manipulation, by voice activation, etc. of the vehicle input device(s). For example, when the vehicle input device(s) are enabled, a user can provide input with respect to the vehicle input device(s) to affect the operation of the vehicle 104 such as to control motion, motion indication, and/or other features associated with the vehicle 104.

The vehicle 104 can include one or more vehicle input devices that are configured to affect the motion of the vehicle 104. Such vehicle input device(s) can include a steering mechanism of the vehicle 104, a braking mechanism of the vehicle 104, an acceleration mechanism of the vehicle 104, and/or other devices. The steering mechanism can include a device that can be adjusted to control the heading of the vehicle 104. For example, the steering mechanism can include a steering wheel, control stick, etc. The braking mechanism can include a device that can be adjusted to control the braking of the vehicle 104. For example, the braking mechanism can include a brake pedal, parking brake, electronic braking system, etc. The acceleration mechanism can include a device that can be adjusted to control the acceleration of the vehicle 104. For example, the acceleration mechanism can include a gas pedal, hand throttle, etc. The vehicle input device(s) can also include an input device that controls the power state of the vehicle 104 (e.g., push button, key switch). The vehicle input device(s) can also include a gear shift and/or a PRND control device (e.g., park-reverse-neutral-drive control).

The vehicle input device(s) can also include one or more vehicle input device(s) that are configured to control an indication of vehicle motion. For example, the vehicle input device(s) can include a turn indication mechanism of the vehicle 104, a hazard indication mechanism of the vehicle 104, and/or other devices. The turn indication mechanism can include a device that can be adjusted to activate an indication (e.g., a turn signal) that the vehicle may turn. For example, the turn indication mechanism can include a turn signal control, etc. The hazard indication mechanism can include a device that can be adjusted to control a hazard indication provided by the vehicle 104 (e.g., hazard lights). For example, the hazard indication mechanism can include a hazard light activation button, etc. Some vehicle input devices can be configured to control both the motion of the vehicle 104 and an indication of vehicle motion. For example, a braking mechanism can be used to cause a deceleration (and/or stop) of the vehicle 104 as well as to activate the braking lights of the vehicle 104 (e.g., to indicate the vehicle is decelerating, stopped, etc.).

In some implementations, the vehicle input device(s) can be associated with other features of the vehicle 104. For instance, the vehicle input device(s) can be associated with control of the windshield wipers, headlights, fog lights, horn, vehicle sound system, windows, cabin lighting (e.g., overhead light, instrument panel brightness, etc.), temperature, fan speed, airflow, seat position and/or conditioning, defrost, hood release, truck release, etc. A user can provide input (e.g., physical manipulation, voice activation, etc.) with respect to such vehicle input devices to control the various aspects of the vehicle 104 associated with the respective vehicle input device.

The operations computing system 106 can include one or more computing devices that are remote from the vehicle 104 (e.g., located off-board the vehicle 104). For example, such computing device(s) can be components of a cloud-based server system and/or other type of computing system that can communicate with the vehicle computing system 102 of the vehicle 104. The computing device(s) of the operations computing system 106 can include various components for performing various operations and functions. For instance, the computing device(s) can include one or more processor(s) and one or more tangible, non-transitory, computer readable media. The one or more tangible, non-transitory, computer readable media can store instructions that when executed by the one or more processor(s) cause the operations computing system 106 (e.g., the one or more processors, etc.) to perform operations and functions, such as those for providing a user control of the vehicle 104 to assist the vehicle 104 in times of distress, as described herein.

A vehicle 104 can experience an event that effects the autonomous operation of the vehicle 104. The event can include a fault associated with the vehicle 104 that hinders an ability of the vehicle 104 to autonomously operate without human user input to the vehicle 104. For instance, the vehicle 104 can experience a fault in the operation of one or more of its sensors 112 (e.g., LIDAR system), a fault associated with the autonomy computing system 114, a fault associated with a vehicle control system 116, and/or other types of faults. By way of example, the vehicle 104 can experience a communication error between the vehicle's onboard systems (e.g., between the motion planning system 134 and the vehicle control system(s) 116) such that the vehicle 104 is unable to properly navigate through its surroundings in the fully autonomous operating mode 108A.

Figure 3:
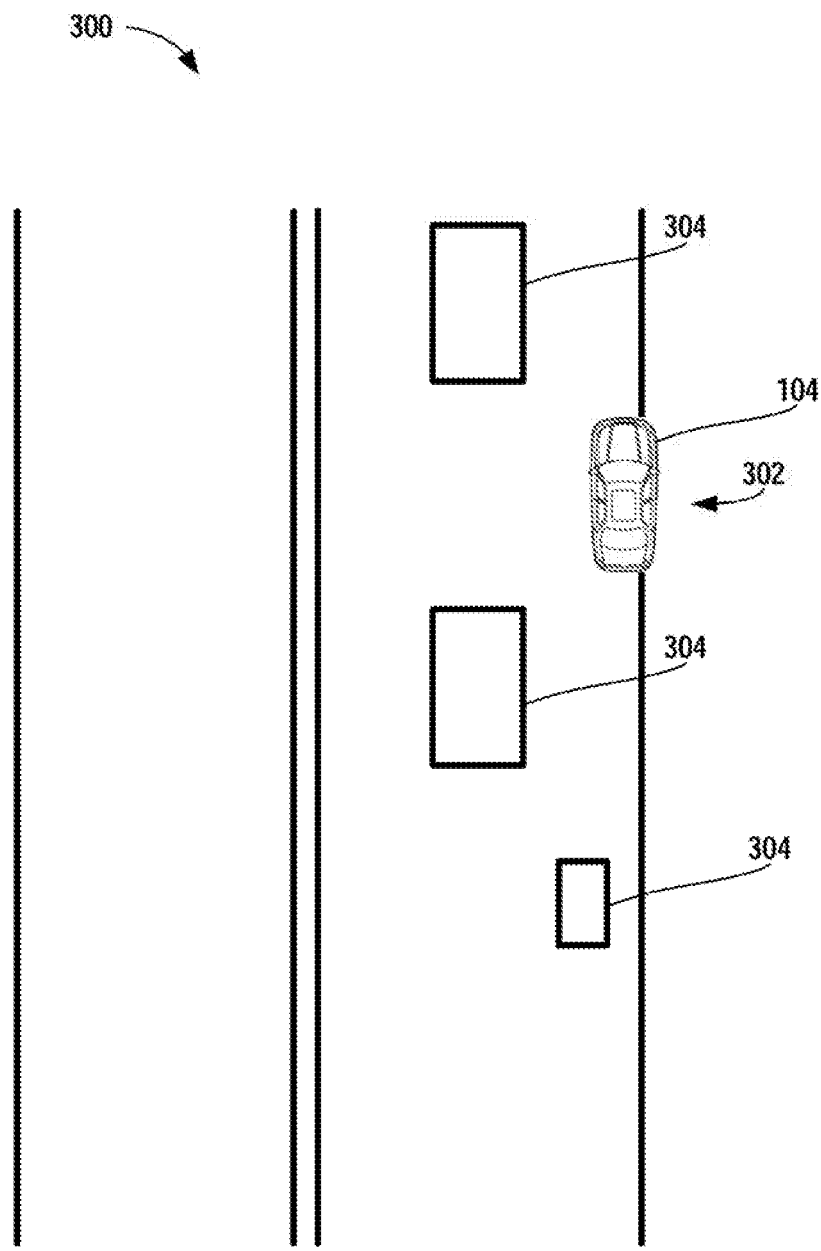
FIG. 3 depicts an example vehicle travel way with a vehicle in a first position according to example embodiments of the present disclosure.

The vehicle 104 can decelerate until the vehicle 104 reaches a stopped position in response to the occurrence of such an event. For instance, FIG. 3 depicts an example vehicle travel way 300 according to example embodiments of the present disclosure. The travel way 300 can include, for example, a roadway of an automobile and/or other types of travel ways. As shown, the vehicle 104 can decelerate to a first position 302 (e.g., a stopped position) that is at least partially in the vehicle travel way 300. This may occur such that the vehicle 104 can avoid travelling a significant distance after the occurrence of an event that hinders autonomous operation of the vehicle 104. One or more other objects 304 (e.g., other vehicles, bicycles, pedestrians, etc.) can also be located in the travel way 300. The other object(s) 304 may also decelerate to a stopped position due to the positioning of the vehicle 104 (e.g., at least partially in the travel way 300).

Returning to FIG. 1, the operations computing system 106 can identify an occurrence of an event associated with the vehicle 104. In some implementations, the vehicle computing system 102 of the vehicle 104 can inform the operations computing system 106 of the occurrence of the event. For example, the vehicle computing system 102 can detect a communication error between the onboard systems of the vehicle 104 (e.g., between the sensors 112 and the autonomy system 114). The vehicle computing system 102 can provide, to the operations computing system 106, data 140 that is indicative of the event associated with the vehicle 104 (e.g., the communication error) and/or that the vehicle 104 is stopping (or has stopped) due to the event. The operations computing system 106 can receive the data 140 from the vehicle computing system 102. The operations computing system 106 can identify that the event associated with the vehicle 104 has occurred based at least in part on the data 140. Furthermore, the operations computing system 106 can determine that the vehicle 104 cannot effectively operate in a fully autonomous operating mode 108A based on the occurrence of the event.

In some implementations, the operations computing system 106 can monitor the vehicle 104 and determine that an event has occurred with respect to the vehicle 104. For example, the operations computing system 106 can monitor data associated with the vehicle 104 (e.g., health and maintenance data, etc.) in real-time, in near real-time, periodically, etc. The operations computing system 106 can determine that an event associated with the vehicle 104 (e.g., that hinders autonomous operation) has occurred based at least in part on the monitored data. In this way, in some implementations, the operation computing system 106 can identify the occurrence of an event associated with the vehicle 104 independent of the vehicle's an onboard event detection.

Additionally, or alternatively, a user can send a communication to the operations computing system 106 and/or otherwise inform the entity associated with the vehicle 104 that an event has occurred. For example, a user (e.g., a passenger, a non-passenger observer of the vehicle 104) can send a message (e.g., textual, audio, etc.) to the operations computing system 106 indicating the occurrence of an event (e.g., a rock striking a sensor 112). In some implementations, the user can contact an operator of an entity associated with the vehicle 104 (e.g., via a telephone conversation, a video conference, etc.).

The vehicle 104 can perform an evaluation to determine whether the vehicle 104 is in condition to be operated by a user. In some implementations, such an evaluation can be performed at the request of and/or by instruction of the operations computing system 106. The vehicle computing system 102 can cause the vehicle 104 to perform an evaluation of the event associated with the vehicle 104 to determine that it is safe for a user to operate the vehicle 104. For example, the vehicle computing system 102 can analyze data associated with the vehicle 104 (e.g., health/maintenance data, sensor data 118, state data 130, prediction data 132, motion plans 134, and/or other data) to perform an onboard diagnostic to determine the cause, source, location, etc. of the event to determine if operating the vehicle 104 in a manual operating mode 108C (and/or semi-autonomous mode 108B) would increase the risk of harm to a user and/or the risk of harm to the vehicle 104. By way of example, the vehicle computing system 102 can determine that the vehicle 104 has a flat tire. The vehicle computing system 102 can provide data 142, to the operations computing system 106, indicating that the vehicle 104 is not in a condition to be operated by a user (e.g., acting as a human driver). In such a case, the operations computing system 106 can coordinate the deployment of a maintenance team to the vehicle 104. In the event that the vehicle computing system 102 determines that the vehicle 104 is safe for user operation, the vehicle computing system 102 can provide data 142, to the operations computing system 106, indicating that the vehicle 104 is in a condition to be operated by a user. The operations computing system 106 can obtain, from the vehicle 104, the data 142 associated with the evaluation of the vehicle 104 that indicates that the vehicle 104 is in a safe condition to be operated by the at least one user.

In some implementations, the operations computing system 106 can perform an evaluation to determine whether the vehicle 104 is in a safe condition to be operated by a user. For example, the operations computing system 106 can perform an evaluation to determine that the vehicle 104 is (or is not) in a condition to be operated by a user based at least in part on data obtained by the vehicle 104, monitored data, and/or other data associated with the vehicle 104. In this way, the operations computing system 106 can obtain data associated with an evaluation of the vehicle 104 that indicates that the vehicle 104 is (or is not) in a safe condition to be operated by a user, without the vehicle 104 having to perform such an evaluation.

In the event the vehicle 104 is safe for a user to operate, the operations computing system 106 can coordinate user assistance for the vehicle 104. For example, in response to identifying the occurrence of the event associated with the vehicle 104 (and/or the determination that the vehicle 104 is safe to operate), the operations computing system 106 can identify one or more users to potentially operate the vehicle 104. For instance, the operations computing system 106 can identify user(s) to move the vehicle 104 from a stopped position (e.g., from the first position 302 shown in FIG. 3).

Figure 4:
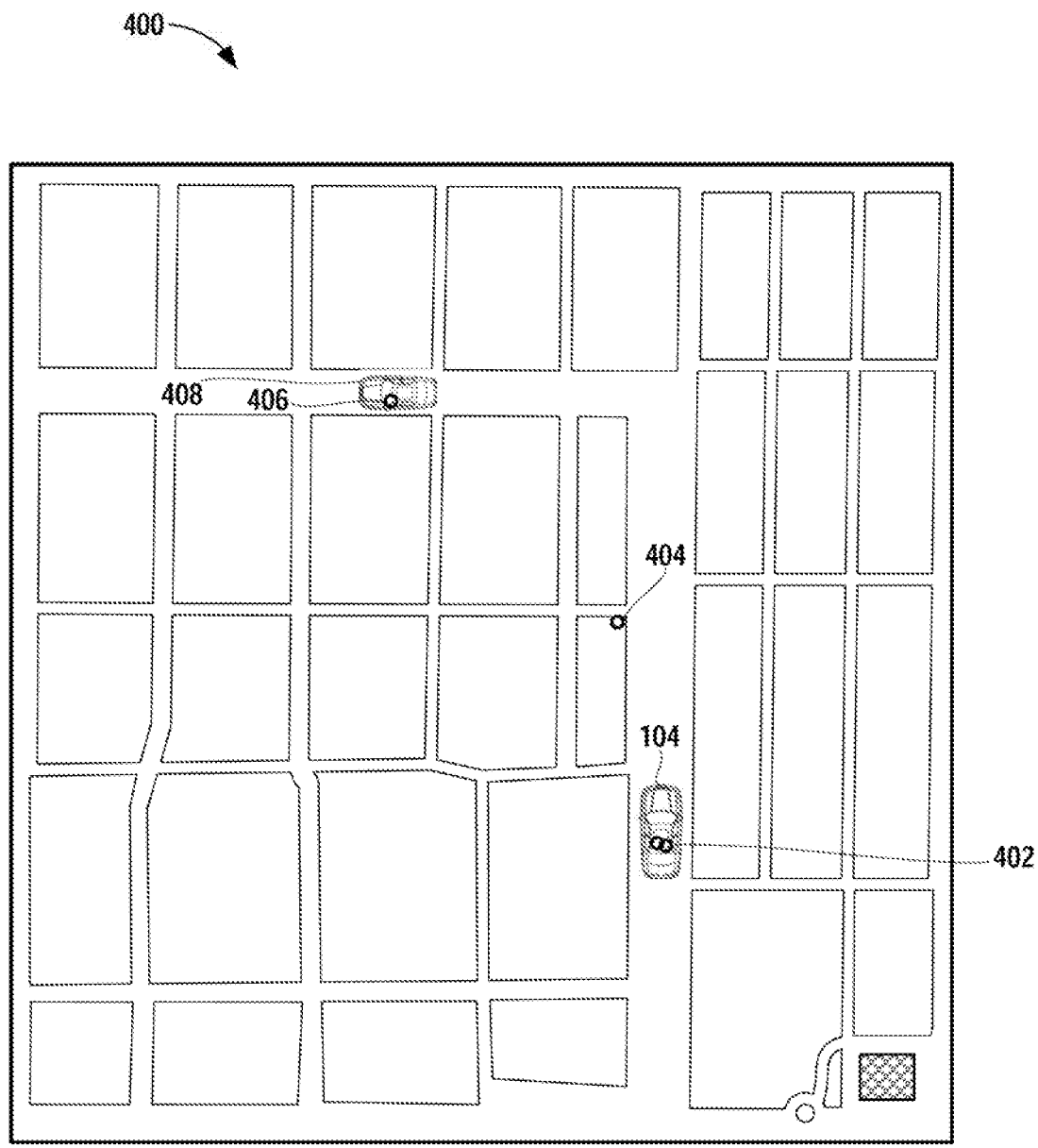
FIG. 4 depicts an example geographic area with user(s) according to example embodiments of the present disclosure.

FIG. 4 depicts an example geographic area 400 with user(s) according to example embodiments of the present disclosure. The vehicle 104 can be stopped within the geographic area 400 due to the occurrence of the event, as described herein. In response to the occurrence of the event, the operations computing system 106 can identify one or more users 110 to potentially operate the vehicle 104. The user(s) can be associated with a vehicle service (e.g., of the entity). For example, the user(s) can include a user that has downloaded a software application associated with the entity (e.g., that is associated with the vehicle 104), a user that has made a service request with the entity, a user that is a customer of the entity, a user that has registered with (e.g., signed-up with, has an account with, has subscribed to) the entity, a user that is a vehicle operator (e.g., human driver) of one or more vehicles within a fleet, etc.

In some implementations, the user(s) can be passenger(s) 402 of the vehicle 104. For example, the vehicle 104 can provide a transportation service (e.g., rideshare service) to one or more passengers 402. The operations computing system 106 can identify the passenger(s) 402 as users that could potentially operate the vehicle 104 based at least in part on the occurrence of the event associated with the vehicle 104 (e.g., that has caused the vehicle 104 to stop).

In some implementations, the user(s) 110 can be non-passenger user(s) 404 (e.g., pedestrians) that are not currently riding in the vehicle 104. By way of example, the vehicle 104 can experience an event (e.g., sensor hardware overheating) while in the geographic area 400. The operations computing system 106 can identify one or more users associated with the vehicle service 104 that are within the vicinity of the vehicle 104 and that could potentially operate the vehicle 104 to move the vehicle 104 to a safer position. To do so, the operations computing system 106 can, for example, identify if any users that have downloaded a software application associated with the entity (e.g., onto a user device associated with the user) are within the vicinity of the vehicle 104 (e.g., based on signals associated with a positioning system of the user device).

Additionally, or alternatively, the operations computing system 106 can identify a user that is a human vehicle operator 406. By way of example, another vehicle 408 within a vehicle fleet (e.g., of the entity that is associated with the vehicle 104) can be located within the vicinity of the vehicle 104. The other vehicle 408 can have a human vehicle operator 406 located within the other vehicle 408. The operations computing system 106 can identify the human vehicle operator 406 of the other vehicle 408 as a user that could potentially operate the vehicle 104 (e.g., to move it to a different location).

In some implementations, the operations computing system 106 can identify user(s) that can potentially operate the vehicle 104 based at least in part on one or more factor(s). For example, the operations computing system 106 can identify the user(s) based at least in part on a distance between the user(s) and the vehicle 104, an estimated time it would take for the user(s) to travel to the vehicle 104, a route the user(s) would traverse to arrive at the location of the vehicle 104, and/or other factors. For example, with reference to FIG. 4, the operations computing system 106 may first identify passengers 402 of the vehicle 104, then nearby non-passenger user(s) 404 of the vehicle service(s), and then human vehicle operator(s) 406 of other vehicles 408 as user(s) to potentially operate the vehicle 104 based on the distance, time, route, etc. between that respective user and the vehicle 104.

Returning to FIG. 1, the operations computing system 106 can determine at least one of the identified users to operate the vehicle 104 (e.g., to move the vehicle 104) based at least in part on a profile associated with the at least one user. For instance, the operations computing system 106 can select a user 110 to operate the vehicle 104 based at least in part on any of the information provided in the profile 200 (and/or other information). For example, the operations computing system 106 can access the profile 200 associated with a user 110 and determine that the user 110 is authorized to operate the vehicle 104 based at least in part on the profile 200 associated with the user 110 (e.g., the information 210 associated with a vehicle operating license of the user 110, if available). Additionally, or alternatively, the operations computing system 106 can determine that the user 110 is willing to operate the vehicle 104 based at least in part on the profile 200 associated with the user 110 (e.g., the data 212 indicative of a willingness of the user 110 to operate a vehicle 104).

In some implementations, the operations computing system 106 can perform an additional user authorization process. For example, if a user 110 is willing to operate the vehicle 104, the operations computing system 106 can provide a communication to the user 110 (e.g., via a user device associated with the user 110, human machine interface 138 of the vehicle 104, etc.) requesting that the user 110 scan the user's vehicle operating license via an imaging device associated with a user device and/or onboard the vehicle 104. In this way, the operations computing system 106 can attempt to obtain up-to-date information regarding the user's legal vehicle operating status.

The following provides an example of the operations computing system 106 identifying and determining a user 110 to operate the vehicle 104. One or more passengers 402 can be riding in the vehicle 104 (e.g., for a transportation service) when a rock strikes the vehicle sensors. As a precautionary measure, the vehicle 104 can decelerate to a stopped position. The stopped position may be at least partially within a vehicle travel way 300 (e.g., roadway). The operations computing system 106 can detect the occurrence of such an event, as described herein. The operations computing system 106 can identify one or more of the passengers 402 of the vehicle 104 as users that can potentially operate the vehicle 104 to move it from the stopped position to a shoulder of the travel way 300. The operations computing system 106 can also identify one or more non-passenger users 404 and/or a human vehicle operator 406, within the vicinity of the vehicle 104, as users that can potentially operate the vehicle 104. The operations computing system 106 can access the profiles associated with these identified users to determine which (if any) of the users are authorized to operate the vehicle 104 and/or are willing to operate the vehicle 104. The operations computing system 106 can identify that a passenger 402 of the vehicle 104, a non-passenger 404, and a human vehicle operator 406 are each authorized and willing to operate the vehicle 104 based on the respective profile(s). The operations computing system 106 can prioritize the passenger 402 of the vehicle 104 as the preferred operator of the vehicle 104 based at least in part on the passenger 402 being the closest distance to the vehicle 104.

Figure 5:
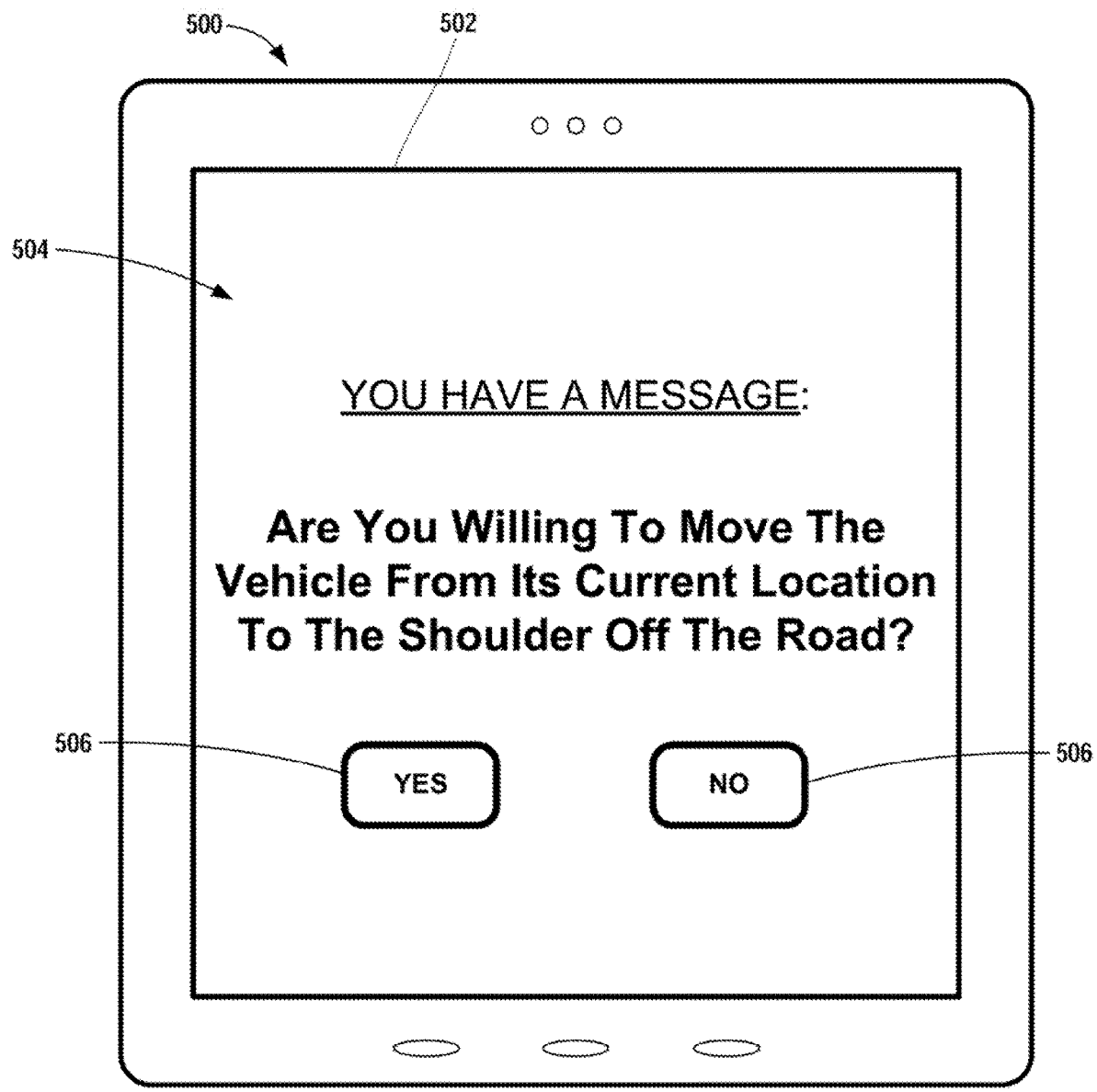
FIG. 5 depicts an example display device with an example user interface according to example embodiments of the present disclosure.

The operations computing system 106 can facilitate communication with the user 110 to request that the user 110 operate the vehicle 104 to control a motion of the vehicle 104 (e.g., to change a location of the vehicle 104). For example, FIG. 5 depicts an example display device 500 with an example user interface 502 according to example embodiments of the present disclosure. The display device 500 can be associated with a user device (e.g., a mobile phone) of the user 110 and/or a human machine interface 138 (e.g., a tablet) located onboard the vehicle 104 (e.g., on and/or within the vehicle 104). The operations computing system 106 can provide data 504 for display on the user interface 502, by the display device 500. The data 504 can be indicative of, for example, a textual message to the user 110. The textual message can inquire as to the user's willingness to operate the vehicle 104 and/or request that the user 110 operate the vehicle 104 (e.g., to move the vehicle 104 to a different position).

In some implementations, the user 110 can interact with the user interface 502 to indicate that the user 110 is willing to operate the vehicle 104. For example, the user 110 can provide user input via the user interface 502 (e.g., input to an interface element 506) indicating that the user 110 will (or will not) operate the vehicle 104. The operations computing system 106 can obtain data indicating that the user 110 has accepted the request to operate the vehicle 104. In some implementations, the operations computing system 106 can provide a communication, to the user 110, acknowledging that the user 110 will (or will not) operate the vehicle 104. In the event that operations computing system 106 obtains data indicating that the user 110 declines the request to operate the vehicle 104, the operations computing system 106 can communicate with another of the identified user(s) (e.g., another passenger, a non-passenger, a human vehicle operator in another vehicle) to request that the other user operate the vehicle 104.

In some implementations, a human operator associated with an entity (e.g., an entity that is associated with the vehicle 104) can contact the user 110 to determine whether the user 110 is willing to operate the vehicle 104 and/or to request that the user 110 operate the vehicle 104. In some implementations, the user 110 can be provided with an incentive (e.g., monetary, credit, discount, increase user rating, etc.) to operate the vehicle 104. In the event that the user 110 operates the vehicle 104 in accordance with the request, the profile 200 of the user 110 and/or an account of the user 110 can be modified to reflect the incentive.

The operations computing system 106 can adjust the vehicle 104 to enable a user to assist the vehicle 104. For instance, the operations computing system 106 can adjust the operating mode of the vehicle 104 to enable a user 110 to operate the vehicle 104. Returning to FIG. 1, the operations computing system 106 can provide one or more control signals 144 to cause the vehicle 104 to enter into an operating mode that allows at least one user 110 to operate the vehicle 104. By way of example, the operations computing system 106 can send one or more first control signals to the vehicle computing system 102 instructing the vehicle 104 to enter into the manual operating mode 108C. As described herein, the manual operating mode 108C can allow a user 110 to operate the vehicle 104 to control a motion of the vehicle 104.

Figure 6:
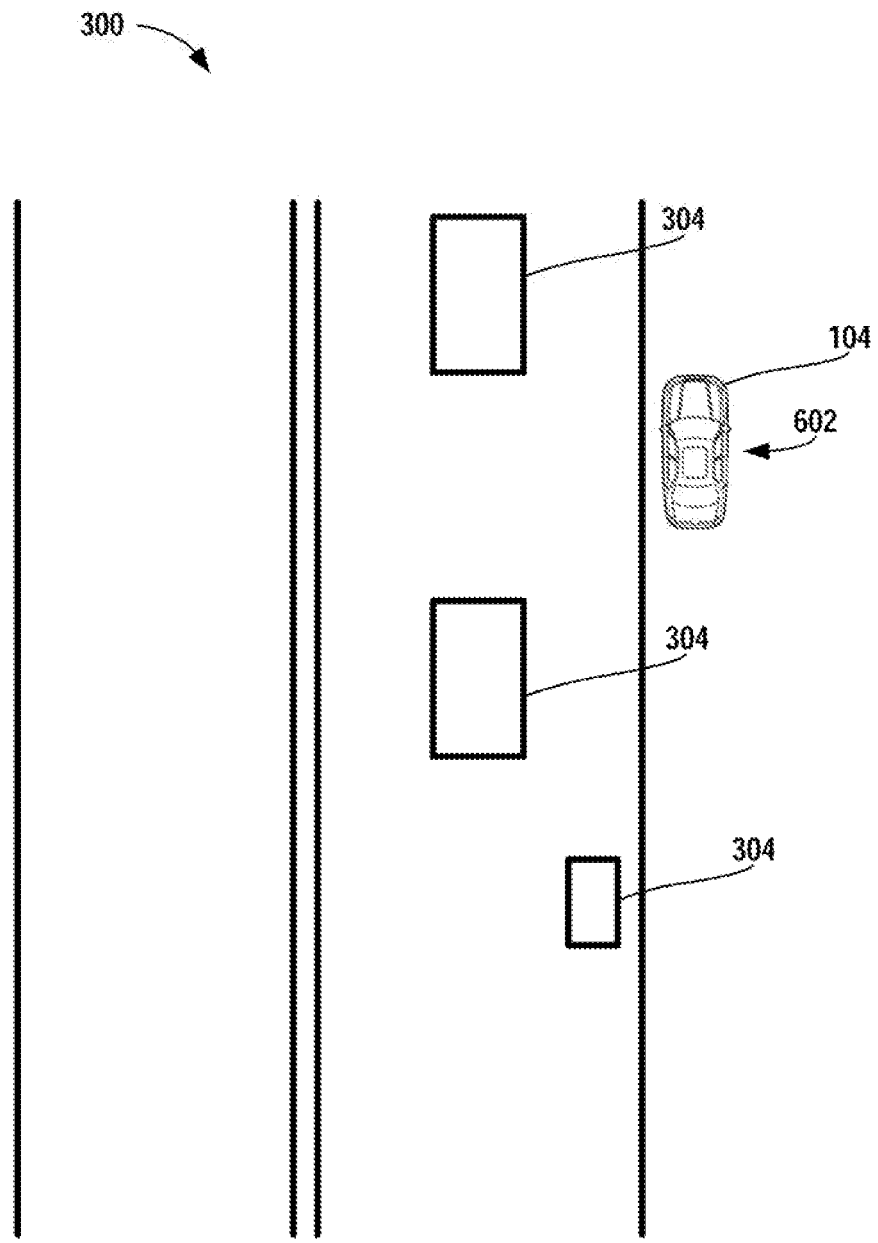
FIG. 6 depicts an example vehicle travel way with a vehicle in a second position according to example embodiments of the present disclosure.

The vehicle computing system 102 can receive the first control signal(s) indicating that the vehicle 104 is to enter into the manual operating mode 108C. The vehicle computing system 102 can adjust the operating mode of the vehicle 104 accordingly. For instance, the vehicle computing system 102 can provide one or more second control signals to one or more systems onboard the vehicle 104 (e.g., the vehicle control systems 116) to cause the vehicle 104 to enter into the manual operating mode 108C. Such onboard systems can enable the vehicle input device(s) (e.g., steering mechanism, acceleration mechanism, braking mechanism, etc.) such that the user 110 can provide user input to the vehicle input devices to at least partially control the motion of the vehicle 104. A vehicle input device can be enabled by, for example, a controller (e.g., microcontroller) that receives the control signal and adjusts a state of the respective vehicle input device from a disabled state in which user input is ignored and/or counter-acted to an enabled state in which user input is allowed to control the vehicle input device. For example, while in the manual operating mode 108C, the user 110 can adjust the steering mechanism of the vehicle 104 to adjust the heading of the vehicle 104, adjust the acceleration mechanism of the vehicle 104 to adjust the acceleration of the vehicle 104, adjust the braking mechanism of the vehicle 104 to decelerate the vehicle 104, etc. In some implementations, the user 110 can control the motion of the vehicle 104 via a user interface that can be provided via a user device associated with the user 110 and/or the human-machine interface(s) 138. The user 110 can operate the vehicle 104 to move the vehicle 104 from the first position 302 (e.g., as shown in FIG. 3) to a second position 602 (e.g., as shown in FIG. 6). The second position 602 can be, for example, completely out of the travel way 300 (e.g., on the shoulder of a road, in a parking lot, etc.). The vehicle 104 can enter into another operating mode when in the second position 602, such as a parked operating mode, a service operating mode, etc.

In some implementations, the vehicle 104 can be subject to one or more limitations of one or more operating parameters of the vehicle 104 while in the manual operating mode 108C. For example, the vehicle 104 can be subject to a limitation on a speed associated with the vehicle 104 (e.g., a maximum speed and/or acceleration limit), a limitation on a distance associated with the vehicle 104 (e.g., a maximum distance the vehicle 104 is permitted to travel from its stopped position), a limitation on an amount of time the user 110 can operate the vehicle 104, and/or other limitations.

Additionally, or alternatively, the vehicle 104 can be subject to a limitation on the location to which the vehicle 104 can travel. By way of example, the vehicle computing system 102 can determine that traffic is located (or likely to be located) to the side of the vehicle 104 based at least in part on sensor data 118 associated with the vehicle's surrounding environment (e.g., LIDAR data showing one or more objects to travel to the side of the vehicle 104) and/or map data 120 provided to the vehicle 104 (e.g., indicating an active travel lane adjacent to the side of the vehicle 104). The vehicle computing system 102 can limit the motion of a steering mechanism of the vehicle 104 such that the user 110 cannot steer the vehicle 104 into traffic from the stopped position of the vehicle 104 while in the manual operating mode 108C. In this way, the vehicle computing system 102 can leverage the data acquired onboard the vehicle 104 and/or provided to the vehicle 104 to help increase the safety of the user 110, the vehicle 104, as well as other objects in the surrounding environment.

In some implementations, the user 110 can assist with adjusting the vehicle 104 into an operating mode that allows the user 110 to control the vehicle 104. For example, the operations computing system 106 can provide a communication to the user 110 indicating a sequence of onboard interfaces that can be used to change the operating mode of the vehicle 104. The user 110 can user the sequence to adjust the operating mode of the vehicle 104. For example, the user 110 may provide user input (e.g., via physical input, voice input) to a plurality of interfaces (e.g., buttons, levers, user interface elements, etc.) onboard the vehicle 104 in a particular order and/or timing to cause the vehicle 104 to enter into the manual operating mode 108C.

Figure 7:
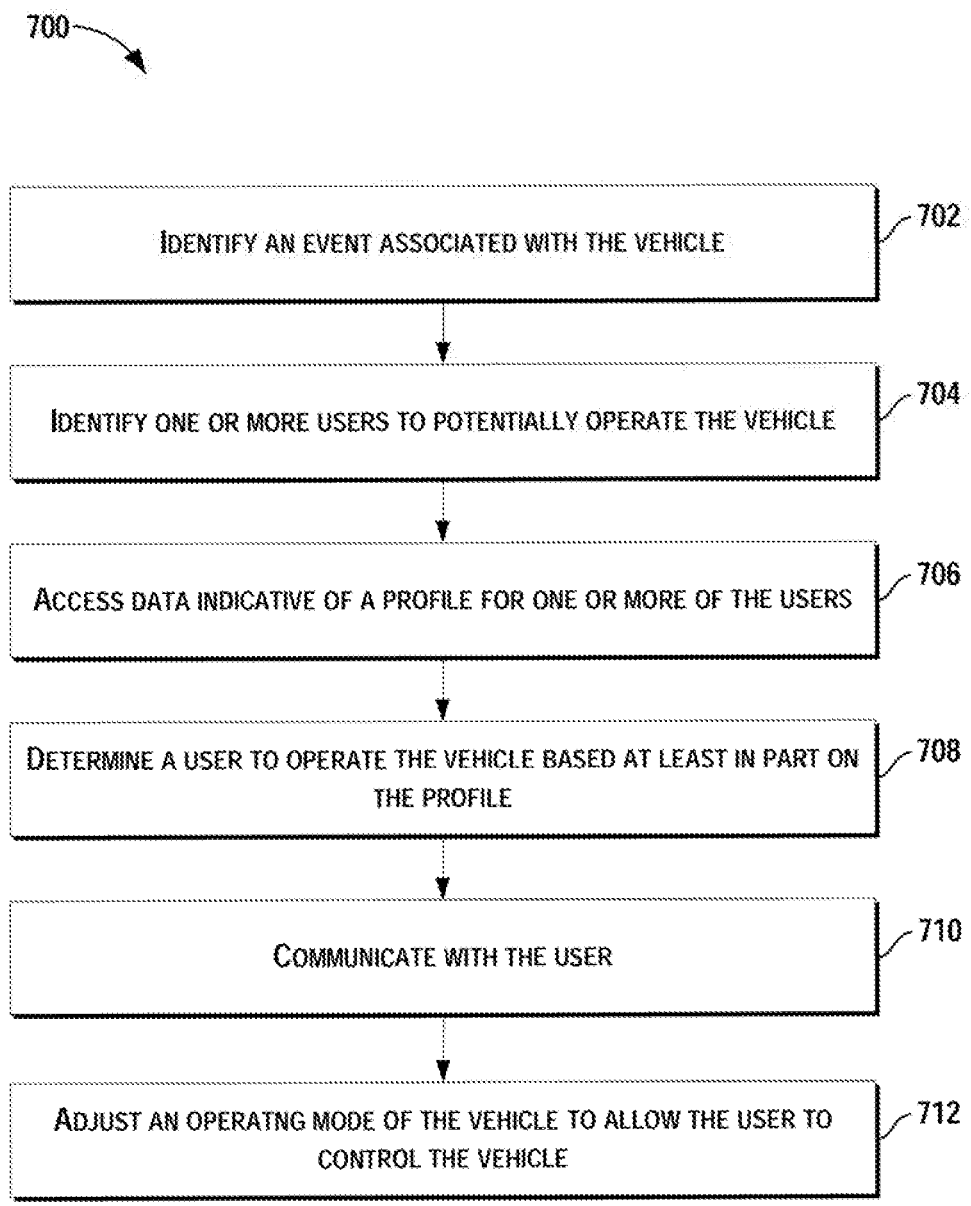
FIG. 7 depicts a flow diagram of an example method of providing user control of autonomous vehicles according to example embodiments of the present disclosure.

FIG. 7 depicts a flow diagram of an example method 700 of providing user control of autonomous vehicles according to example embodiments of the present disclosure. One or more portion(s) of the method 700 can be implemented by one or more computing devices such as, for example, the one or more computing device(s) of the operations computing system 106. Each respective portion of the method 700 (e.g., 702-712) can be performed by any (or any combination) of the one or more computing devices. For example, one portion can be performed by a first computing device of the operations computing system 106 and another portion can be performed by the first computing device and/or a different computing device of the vehicle computing system 102. Moreover, one or more portion(s) of the method 700 can be implemented as an algorithm on the hardware components of the device(s) described herein (e.g., as in FIGS. 1 and 8), for example, to enable a user to control an autonomous vehicle to provide the vehicle with assistance. FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At (702), the method 700 can include identifying an event associated with a vehicle. For instance, the operations computing system 106 can identify an occurrence of an event associated with a vehicle 104. The event can hinder an ability of the vehicle 104 to operate in an autonomous operating mode. For example, the vehicle 104 can experience an error associated with the autonomy system 114, damage to one or more sensors 112 onboard the vehicle 104, etc. The vehicle computing system 102 can send data indicative of the event to the operations computing system 106 to report the occurrence of the event. Moreover, such an event can cause the vehicle 104 to decelerate to a stopped position, as a precautionary safety measure. As described herein, the vehicle 104 can be in a stopped position that is at least partially in a travel way 300.

At (704), the method 700 can include identifying one or more users to potentially operate the vehicle. For instance, in response to identifying the occurrence of the event associated with the vehicle 104, the operations computing system 106 can identify one or more users to potentially operate the vehicle 104. For example, the operations computing system 106 can identify one or more users that can potentially move the vehicle 104 from the stopped position. In some implementations, an identified user can be a passenger of the vehicle 104 (e.g., for a transportation service provided by the vehicle 104). In some implementations, a user may not be a passenger of the vehicle 104. The user can, however, be associated with a vehicle service of the vehicle 104 (e.g., a user that has downloaded a software application for requesting vehicle services) and not associated with a vehicle maintenance team.

At (706), the method 700 can include accessing data indicative of a profile for one or more of the users. For instance, for each (or at least a subset of) the identified user(s), the operations computing system 106 can access data indicative of a profile 200 associated with the respective user. As described herein, the profile 200 associated with a user can indicate that the user is legally able to operate the vehicle 104, a willingness of the user to operate the vehicle 104 and/or other information. Moreover, in response to the occurrence of the event associated with the vehicle 104, the operations computing system 106 can determine a user 110 to operate the vehicle 104 based at least in part on a profile 200 associated with the user 110, at (708). For example, the operations computing system 106 can select a user 110 to operate the vehicle 104 based at least in part on the profile 200 indicating that the user 110 is legally authorized to operate the vehicle 104 and that the user 110 is willing to operate the vehicle 104. In some implementations, the operations computing system can determine more than one user to operate the vehicle 104.

In some implementations, the determination of the user to operate the vehicle 104 and/or the determination of the user's willingness to operate the vehicle 104 can include interaction with the user (e.g., device messaging, by another human, etc.). For instance, at (710), the method 700 can include communicating with the user. In some implementations, the operations computing system 106 can provide a communication to the user 110 requesting that the user 110 operate the vehicle 104 to control a motion of the vehicle 104 (e.g., to move the vehicle 104 completely out of the travel way 300). As described herein with reference to FIG. 5, such a communication can be provided to the user 110 via a user device associated with the user 110 and/or to a human machine interface 138 associated with the vehicle 104. Additionally, or alternatively, a human operator (e.g., associated with the entity) and the user can perform a two-way voice and/or video call to help select the user to operate the vehicle 104 (e.g., to determine the user's willingness). In some implementations, the user 110 can confirm that the user is willing to operate the vehicle 104 (e.g., via user input provided to the user device and/or human machine interface 138). In this way, the user can also be included in the process of determining the user-operator of the vehicle. In the event that the operations computing system 106 selects a plurality of users to operate the vehicle 104, the operations computing system 106 can send a communication to each of the users, requesting that the respective user operate the vehicle 104. The operations computing system 106 can ultimately select a user of the user(s) that accept the request (e.g., the user that is the first to respond, the user with the highest user rating, etc.) to operate the vehicle 104.

At (712), the method 700 can include adjusting an operating mode of the vehicle to allow the user to control the vehicle. For instance, the operations computing system 106 can provide one or more control signals 144 to cause the vehicle 104 to enter into a manual operating mode 108C that allows the user 110 to operate the vehicle 104. The vehicle 104 can receive the control signal(s) 144 and/or other data indicating that the vehicle 104 is to enter into the manual operating mode 108C. The vehicle 104 can adjust an operating mode of the vehicle 104 such that the vehicle 104 enters into the manual operation mode 108C to allow the user 110 to operate the vehicle 104 to control the motion of the vehicle 104. In some implementations, the vehicle 104 is subject to one or more limitations of one or more operating parameters of the vehicle 104 while in the manual operating mode 108C. The limitations can include, for example, a limitation on a speed associated with the vehicle 104, a limitation on a distance associated with the vehicle 104, a limitation on a location to which the vehicle 104 can travel, or a limitation of an amount of time the user 110 can operate the vehicle 104. As described herein, the limitation on the location can be based at least in part on at least one of sensor data 118 acquired by the vehicle 104 or map data 120 provided to the vehicle 104.

Figure 8:
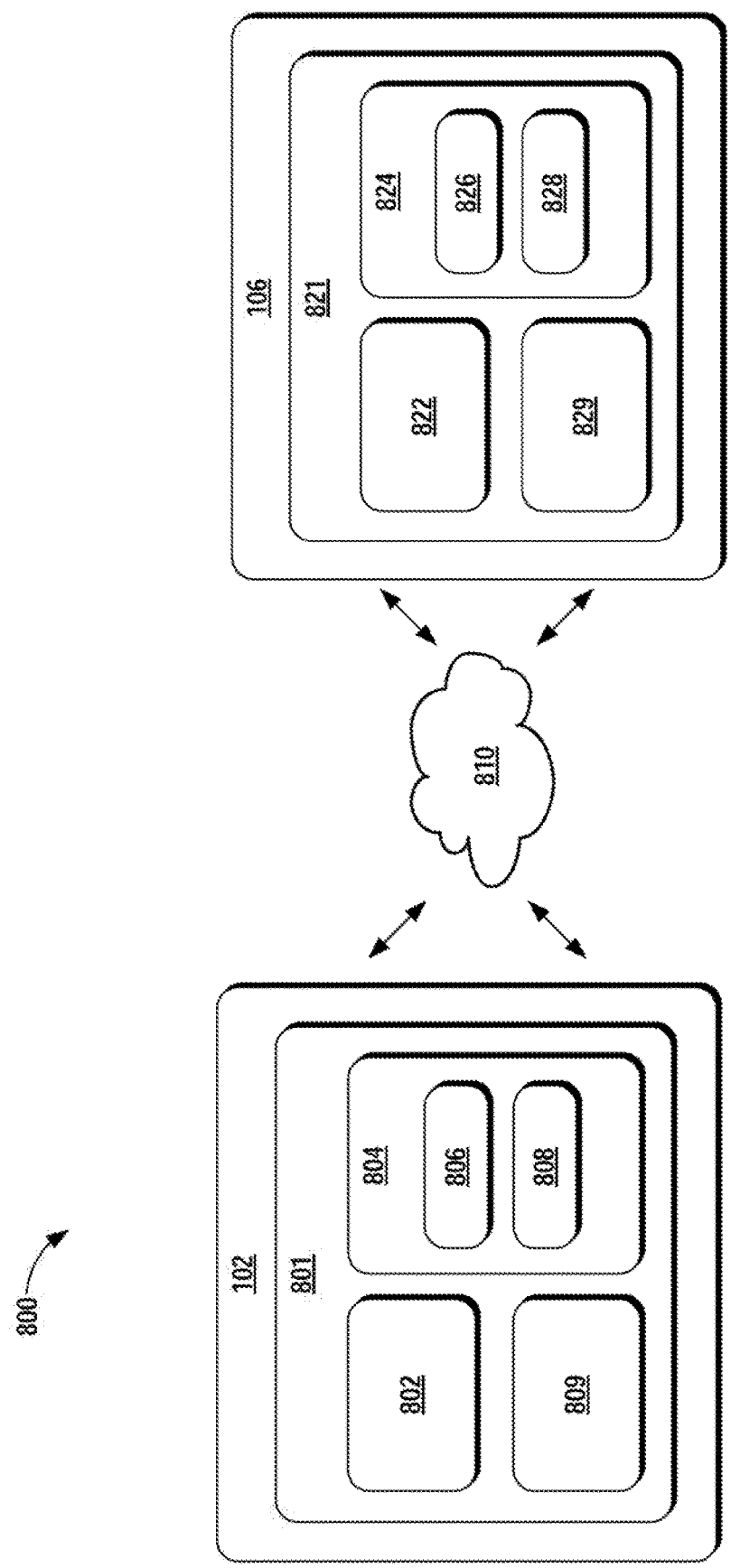
FIG. 8 depicts example system components according to example embodiments of the present disclosure.

FIG. 8 depicts an example system 800 according to example embodiments of the present disclosure. The example system 800 illustrated in FIG. 8 is provided as an example only. The components, systems, connections, and/or other aspects illustrated in FIG. 8 are optional and are provided as examples of what is possible, but not required, to implement the present disclosure. The example system 500 can include the vehicle computing system 102 of the vehicle 104 and the operations computing system 106 that can be communicatively coupled to one another over one or more networks 810. As described herein, the operations computing system 106 can be associated with a central operations system and/or an entity associated with the vehicle 104 such as, for example, a vehicle owner, vehicle manager, fleet operator, service provider, etc.

The computing device(s) 801 of the vehicle computing system 102 can include processor(s) 802 and a memory 804. The one or more processors 802 can be any suitable processing device (e.g., a processor core, a microprocessor, an ASIC, a FPGA, a controller, a microcontroller, etc.) and can be one processor or a plurality of processors that are operatively connected. The memory 804 can include one or more non-transitory computer-readable storage media, such as RAM, ROM, EEPROM, EPROM, one or more memory devices, flash memory devices, etc., and combinations thereof.

The memory 804 can store information that can be accessed by the one or more processors 802. For instance, the memory 804 (e.g., one or more non-transitory computer-readable storage mediums, memory devices) on-board the vehicle 104 can include computer-readable instructions 806 that can be executed by the one or more processors 802. The instructions 806 can be software written in any suitable programming language or can be implemented in hardware. Additionally, or alternatively, the instructions 806 can be executed in logically and/or virtually separate threads on processor(s) 802.

For example, the memory 804 on-board the vehicle 104 can store instructions 806 that when executed by the one or more processors 802 on-board the vehicle 104 cause the one or more processors 802 (the vehicle computing system 102) to perform operations such as any of the operations and functions of the vehicle computing system 102, as described herein.

The memory 804 can store data 808 that can be obtained, received, accessed, written, manipulated, created, and/or stored. The data 808 can include, for instance, data associated with an operating mode of the vehicle, data associated with an event, data associated with an event safety evaluation, data associated with one or more vehicle input devices, data associated with vehicle services, sensor data 118, map data 120, positioning data, state data 130, prediction data 132, motion plans 134, cost functions, and/or other data/information as described herein. In some implementations, the computing device(s) 801 can obtain data from one or more memory device(s) that are remote from the vehicle 104.

The computing device(s) 801 can also include a communication interface 809 used to communicate with one or more other system(s) on-board the vehicle 104 and/or a remote computing device that is remote from the vehicle 104 (e.g., of the operations computing system 106). The communication interface 809 can include any circuits, components, software, etc. for communicating via one or more networks (e.g., 810). In some implementations, the communication interface 809 can include, for example, one or more of a communications controller, receiver, transceiver, transmitter, port, conductors, software and/or hardware for communicating data.

The operations computing system 106 can include one or more computing devices 821 that are remote from the vehicle computing system 102. The computing device(s) 821 of the operations computing system 106 can include processor(s) 822 and a memory 824. The one or more processors 822 can be any suitable processing device (e.g., a processor core, a microprocessor, an ASIC, a FPGA, a controller, a microcontroller, etc.) and can be one processor or a plurality of processors that are operatively connected. The memory 824 can include one or more non-transitory computer-readable storage media, such as RAM, ROM, EEPROM, EPROM, one or more memory devices, flash memory devices, etc., and combinations thereof.

The memory 824 can store information that can be accessed by the one or more processors 822. For instance, the memory 824 (e.g., one or more non-transitory computer-readable storage mediums, memory devices) can include computer-readable instructions 826 that can be executed by the one or more processors 822. The instructions 826 can be software written in any suitable programming language or can be implemented in hardware. Additionally, or alternatively, the instructions 826 can be executed in logically and/or virtually separate threads on processor(s) 822.

For example, the memory 824 can store instructions 826 that when executed by the one or more processors 822 cause the one or more processors 822 (the operations computing system 106) to perform operations such as any of the operations and functions of the operations computing system 106 or for which the operations computing system 106 is configured, as described herein, operations and functions for providing user control of autonomous vehicles (e.g., one or more portions of method 700), and/or any other operations and functions described herein.

The memory 824 can store data 828 that can be obtained, received, accessed, written, manipulated, created, and/or stored. The data 828 can include, for instance, data associated with an event experienced by a vehicle, data associated with an event safety evaluation, data associated with the operating modes of the vehicle, data associated with profiles of users, other data associated with a vehicle and/or a user, and/or other data/information as described herein. In some implementations, the computing device(s) 821 can obtain data from one or more memory device(s) that are remote from the operations computing system 106 and/or are onboard the vehicle 104.

The computing device(s) 821 can also include a communication interface 829 used to communicate with one or more system(s) onboard the vehicle 104 and/or another computing device that is remote from the operations computing system 106. The communication interface 829 can include any circuits, components, software, etc. for communicating via one or more networks (e.g., 810). In some implementations, the communication interface 829 can include, for example, one or more of a communications controller, receiver, transceiver, transmitter, port, conductors, software and/or hardware for communicating data.

The network(s) 810 can be any type of network or combination of networks that allows for communication between devices. In some embodiments, the network(s) 810 can include one or more of a local area network, wide area network, the Internet, secure network, cellular network, mesh network, peer-to-peer communication link and/or some combination thereof and can include any number of wired or wireless links. Communication over the network(s) 810 can be accomplished, for instance, via a communication interface using any type of protocol, protection scheme, encoding, format, packaging, etc.

Computing tasks discussed herein as being performed at computing device(s) remote from the vehicle can instead be performed at the vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computing system for providing user control of autonomous vehicles, comprising:
   one or more processors; and
   one or more memory devices, the one or more memory devices storing instructions that when executed by the one or more processors cause the computing system to perform operations, the operations comprising:
   identifying an occurrence of an event associated with an autonomous vehicle, wherein the autonomous vehicle is included in a vehicle fleet for providing vehicles services to users, wherein the vehicle fleet comprises a plurality of vehicles associated with a transportation service;
   in response to identifying the occurrence of the event associated with the autonomous vehicle, identifying one or more human vehicle operators associated with one or more other vehicles of the vehicle fleet to potentially operate the autonomous vehicle to move the autonomous vehicle from a stopped position;
   determining a human vehicle operator located within another vehicle of the vehicle fleet to operate the autonomous vehicle based at least in part on a profile associated with the human vehicle operator, wherein the profile associated with the human vehicle operator comprises data indicative of a willingness of the human vehicle operator to operate the autonomous vehicle, and wherein determining the human vehicle operator to operate the autonomous vehicle based at least in part on the profile associated with the human vehicle operator comprises:
     in response to identifying the one or more human vehicle operators, accessing one or more profiles associated with the one or more human vehicle operators, wherein the profile associated with the human vehicle operator is one of the one or more profiles;
     determining, based on the profile associated with the human vehicle operator, that the human vehicle operator is authorized to operate the autonomous vehicle;
     determining, based on the data indicative of the willingness of the human vehicle operator to operate the autonomous vehicle, that the human vehicle operator is willing to operate the autonomous vehicle; and
     selecting the human vehicle operator from the one or more human vehicle operators in response to determining that the human vehicle operator is authorized and willing to operate the autonomous vehicle;

facilitating communication with the human vehicle operator to request that the human vehicle operator operate the autonomous vehicle to control a motion of the autonomous vehicle; and providing one or more control signals to cause the autonomous vehicle to enter into an operating mode that allows the human vehicle operator to control the motion of the autonomous vehicle.

2. The computing system of claim 1, wherein the operations further comprise:

obtaining data associated with an evaluation of the autonomous vehicle that indicates that the autonomous vehicle is in a safe condition to be operated by the human vehicle operator.

3. The computing system of claim 1, wherein the event comprises a fault associated with the autonomous vehicle that hinders an ability of the autonomous vehicle to autonomously operate without human user input to the autonomous vehicle.

4. The computing system of claim 1, wherein facilitating communication with the human vehicle operator comprises:

providing a communication to a user device associated with the human vehicle operator.

5. The computing system of claim 4, wherein the communication comprises a textual message.

6. The computing system of claim 4, wherein the communication comprises an incentive for the human vehicle operator to assist the autonomous vehicle.

7. The computing system of claim 4, wherein the communication is provided via a software application associated with an entity the coordinates the provision of vehicle services by the vehicle fleet based at least in part on service requests for vehicle services.

8. The computing system of claim 1, wherein identifying the one or more human vehicle operators to potentially operate the autonomous vehicle comprises:

identifying the one or more human vehicle operators based at least in part on at least one of a distance, a time, or a route between the vehicle of the human vehicle operator and the autonomous vehicle.

9. A computer-implemented method of providing user control of autonomous vehicles, comprising:

identifying, by a computing system comprising one or more computing devices, an occurrence of an event associated with an autonomous vehicle, wherein the autonomous vehicle is included in a vehicle fleet for providing vehicles services to users, wherein the vehicle fleet comprises a plurality of vehicles associated with a transportation service;

in response to identifying the occurrence of the event associated with the autonomous vehicle, identifying, by the computing system, one or more human vehicle operators associated with one or more other vehicles of the vehicle fleet to potentially operate the autonomous vehicle to move the autonomous vehicle;

determining, by the computing system, a human vehicle operator located within another fleet of the vehicle fleet to operate the autonomous vehicle based at least in part on a profile associated with the human vehicle operator, wherein the profile associated with the human vehicle operator comprises data indicative of a willingness of the human vehicle operator to operate the autonomous vehicle, and wherein determining the human vehicle operator to operate the autonomous vehicle based at least in part on the profile associated with the human vehicle operator comprises:

in response to identifying the one or more human vehicle operators, accessing one or more profiles associated with the one or more human vehicle operators, wherein the profile associated with the human vehicle operator is one of the one or more profiles;

determining, based on the profile associated with the human vehicle operator, that the human vehicle operator is authorized to operate the autonomous vehicle;

determining, based on the data indicative of the willingness of the human vehicle operator to operate the autonomous vehicle, that the human vehicle operator is willing to operate the autonomous vehicle; and selecting the human vehicle operator from the one or more human vehicle operators in response to determining that the human vehicle operator is authorized and willing to operate the autonomous vehicle;

requesting, by the computing system, that the human vehicle operator operate the autonomous vehicle to control a motion of the autonomous vehicle; and providing, by the computing system, one or more control signals to cause the autonomous vehicle to enter into an operating mode that allows the human vehicle operator to operate the autonomous vehicle.

10. The computer-implemented method of claim 9, wherein the autonomous vehicle is subject to one or more limitations of one or more operating parameters of the autonomous vehicle while in the operating mode.

11. The computer-implemented method of claim 9, wherein the one or more limitations comprise at least one of a limitation on a speed associated with the autonomous vehicle, a limitation on a distance associated with the autonomous vehicle, a limitation on a location to which the autonomous vehicle can travel, or a limitation of an amount of time the human vehicle operator can operate the autonomous vehicle.

12. The computer-implemented method of claim 11, wherein the limitation on the location is based at least in part on at least one of sensor data acquired by the autonomous vehicle or map data provided to the autonomous vehicle.

13. The computer-implemented method of claim 9, wherein the autonomous vehicle is in a stopped position that is at least partially in a travel way.

14. The computer-implemented method of claim 13, wherein requesting that the human vehicle operator operate the autonomous vehicle to control the motion of the autonomous vehicle comprises:

providing, by the computing system, a communication to a user device associated with the human vehicle operator, the communication comprising a request to control the motion of the autonomous vehicle to move the autonomous vehicle completely out of the travel way.

15. One or more non-transitory computer-readable media comprising instructions that when executed by a computing system comprising one or more computing devices cause the computing system to perform operations comprising:

identifying an occurrence of an event associated with an autonomous vehicle, wherein the autonomous vehicle is included in a vehicle fleet, wherein the vehicle fleet comprises a plurality of vehicles associated with a transportation service;

identifying one or more human vehicle operators associated with one or more other vehicles of the vehicle fleet to potentially operate the autonomous vehicle to move the autonomous vehicle based at least in part on the occurrence of the event;

determining a human vehicle operator located within another vehicle of the vehicle fleet to operate the autonomous vehicle based at least in part on a profile associated with the human vehicle operator, wherein the profile associated with the human vehicle operator comprises data indicative of a willingness of the human vehicle operator to operate the autonomous vehicle and information associated with a vehicle operating license associated with the human vehicle operator; and providing one or more control signals to cause the autonomous vehicle to enter into an operating mode that allows the human vehicle operator to operate the autonomous vehicle.

16. The one or more non-transitory computer-readable media of claim 15, wherein the operations further comprise:
facilitating communication with the human vehicle operator to request that the human vehicle operator operate the autonomous vehicle.

17. The one or more non-transitory computer-readable media of claim 16, wherein facilitating communication with the human vehicle operator to request that the human vehicle operator operate the autonomous vehicle comprises:
providing a textual message to a user device associated with the human vehicle operator, the textual message comprising at least one of an inquiry as to the human vehicle operator's willingness to operate the autonomous vehicle or request that the user operate the autonomous vehicle.

18. The one or more non-transitory computer-readable media of claim 15, wherein the operations further comprise:
determining that a passenger of the autonomous vehicle is not willing or unable to operate the autonomous vehicle.

19. The computing system of claim 1, wherein determining the user further comprises:
determining whether the autonomous vehicle has a passenger that is authorized and willing to operate the autonomous vehicle, then determining whether there is a non-passenger user of the vehicle service that is authorized and willing to operate the autonomous vehicle, and then determining the human vehicle operator is authorized and willing to operate the autonomous vehicle, wherein determining whether the autonomous vehicle has the passenger that is authorized and willing to operate the autonomous vehicle is prioritized over determining whether there is the non-passenger user of the vehicle service that is authorized and willing to operate the autonomous vehicle, and wherein determining whether there is the non-passenger user of the vehicle service that is authorized and willing to operate the autonomous vehicle is prioritized over determining the human vehicle operator.

* * * * *